US008833506B2

(12) United States Patent
Sunaga et al.

(10) Patent No.: US 8,833,506 B2
(45) Date of Patent: Sep. 16, 2014

(54) POWER STEERING APPARATUS

(75) Inventors: Sosuke Sunaga, Higashimatsuyama (JP); Shogo Ishikawa, Saitama (JP)

(73) Assignee: Hitachi Automotive Systems Steering, Ltd., Hiki-gun (JP)

(*) Notice: Subject to any disclaimer, the term of this patent is extended or adjusted under 35 U.S.C. 154(b) by 91 days.

(21) Appl. No.: 13/529,127

(22) Filed: Jun. 21, 2012

(65) Prior Publication Data
US 2013/0015013 A1    Jan. 17, 2013

(30) Foreign Application Priority Data

Jul. 12, 2011  (JP) .................................. 2011-153512

(51) Int. Cl.
*B62D 5/06* (2006.01)
*B62D 5/30* (2006.01)
*B62D 5/24* (2006.01)
*B62D 5/065* (2006.01)

(52) U.S. Cl.
CPC ........ *B62D 5/06* (2013.01); *B62D 5/064* (2013.01); *B62D 5/30* (2013.01); *B62D 5/062* (2013.01); *B62D 5/24* (2013.01); *B62D 5/065* (2013.01); *B62D 5/063* (2013.01)
USPC ............ 180/421; 180/406; 180/417; 180/439

(58) Field of Classification Search
USPC ......... 180/404, 405, 406, 407, 417, 420, 421, 180/429, 439, 441, 442
See application file for complete search history.

(56) References Cited

U.S. PATENT DOCUMENTS

| 7,318,386 | B2 * | 1/2008 | Dudra et al. ................... 114/150 |
| 8,479,870 | B2 * | 7/2013 | Yoda et al. ..................... 180/422 |
| 2005/0205338 | A1 | 9/2005 | Okada et al. | |

FOREIGN PATENT DOCUMENTS

| JP | 2005-255001 A | 9/2005 |
| JP | 2006-298284 A | 11/2006 |

* cited by examiner

*Primary Examiner* — Joseph M Rocca
*Assistant Examiner* — Marc A Scharich
(74) *Attorney, Agent, or Firm* — Foley & Lardner LLP

(57) ABSTRACT

A power steering apparatus including a power cylinder, first and second pumps, a control valve serving for selectively supplying a working fluid supplied from the first or second pump to one of a pair of pressure chambers of the power cylinder in accordance with a steering operation, first and second reservoir tanks, and a return passage changeover valve disposed between the control valve and the first and second pumps, the return passage changeover valve serving for communicating the first and second pumps with the control valve regardless of an axial position of a valve element and communicating one of the first and second reservoir tanks with the control valve in accordance with the axial position of the valve element to thereby carry out changeover between circulating fluid passages for circulating the working fluid to the first reservoir tank and the second reservoir tank.

8 Claims, 11 Drawing Sheets

POWER STEERING APPARATUS

BACKGROUND OF THE INVENTION

The present invention relates to a power steering apparatus that assists a steering effort of a driver with a fluid pressure, and more particularly to an integral power steering apparatus mainly useful in large vehicles.

Japanese Patent Application Unexamined Publication No. 2005-255001 discloses an integral power steering apparatus including a main pump that is driven by an engine, and a subsidiary pump serving for complementing the main pump. The main pump is driven to supply fluid pressure in an ordinary condition, and the subsidiary pump is driven in a case where malfunction of the main pump occurs. By thus using the two pumps, the integral power steering apparatus can perform steering assist even when the engine is stopped.

SUMMARY OF THE INVENTION

However, in the conventional power steering apparatus, the subsidiary pump complements the main pump, specifically, the subsidiary pump is driven only in a case where there occurs an abnormality in a fluid pressure circuit for the main pump. Therefore, concurrent use of both the two pumps cannot be made so that effective use of the subsidiary pump cannot be sufficiently achieved.

The present invention was made in consideration of the above-described problem in the conventional power steering apparatus. It is an object of the present invention to provide a power steering apparatus in which a subsidiary pump can be sufficiently effectively used.

In one aspect of the present invention, there is provided a power steering apparatus for a vehicle having a steering wheel and a steerable road wheel, the power steering apparatus including:
- a steering mechanism that serves for steering the steerable road wheel in accordance with a steering effort inputted to the steering mechanism through the steering wheel;
- a power cylinder with a pair of pressure chambers which applies a steering force to the steerable road wheel on the basis of a differential pressure between a pressure of a working fluid in one of the pair of pressure chambers and a pressure of the working fluid in the other thereof;
- a first pump that is rotationally driven to supply the working fluid to the power cylinder by a first drive source;
- a second pump that is rotationally driven to supply the working fluid to the power cylinder by a second drive source provided separately from the first drive source;
- a control valve disposed in the steering mechanism, the control valve serving for selectively supplying the working fluid supplied from the first pump or the second pump to one of the pair of pressure chambers of the power cylinder in accordance with a steering operation of the steering wheel;
- a first reservoir tank in which the working fluid is reserved;
- a second reservoir tank in which the working fluid is reserved;
- a return passage changeover valve disposed between the control valve and the first and second pumps, the return passage changeover valve including a valve element accommodating bore and a valve element disposed within the valve element accommodating bore so as to be moveable along an axial direction of the valve element accommodating bore, the return passage changeover valve serving for communicating the first and second pumps with the control valve regardless of an axial position of the valve element and communicating one of the first and second reservoir tanks with the control valve in accordance with the axial position of the valve element to thereby carry out changeover between a circulating fluid passage through which the working fluid is circulated to the first reservoir tank and a circulating fluid passage through which the working fluid is circulated to the second reservoir tank,
- a first check valve disposed between the first pump and the return passage changeover valve, the first check valve being operated to allow only a flow of the working fluid flowing from a side of the first pump toward a side of the return passage changeover valve, and
- a second check valve disposed between the second pump and the return passage changeover valve, the second check valve being operated to allow only a flow of the working fluid flowing from the side of the second pump toward the side of the return passage changeover valve,
- wherein when the working fluid is supplied from the first pump, the valve element of the return passage changeover valve is moved to a first axial position in which fluid communication between the control valve and the first reservoir tank is established and fluid communication between the control valve and the second reservoir tank is blocked, and
- wherein when the working fluid is supplied from the second pump only, the valve element of the return passage changeover valve is moved to a second axial position in which the fluid communication between the control valve and the first reservoir tank is blocked and the fluid communication between the control valve and the second reservoir tank is established.

The power steering apparatus of the present invention can attain the following effects. Even when there occurs a malfunction in one of two pumps, steering assist can be successively carried out by allowing the other pump to supply a working fluid while preventing the one of two pumps from supplying the working fluid. Further, concurrent supply of the working fluid from both the pumps can be carried out through a return passage changeover valve. As a result, the respective pumps can be downsized to reduce the capacity, thereby serving for reducing a drive loss of the one of two pumps upon supplying the working fluid only by the one of two pumps.

The other objects and features of this invention will become understood from the following description with reference to the accompanying drawings.

DETAILED DESCRIPTION OF THE INVENTION

In the following, a power steering apparatus according to an embodiment of the present invention is described with reference to FIGS. 1-11.

Figure 1:
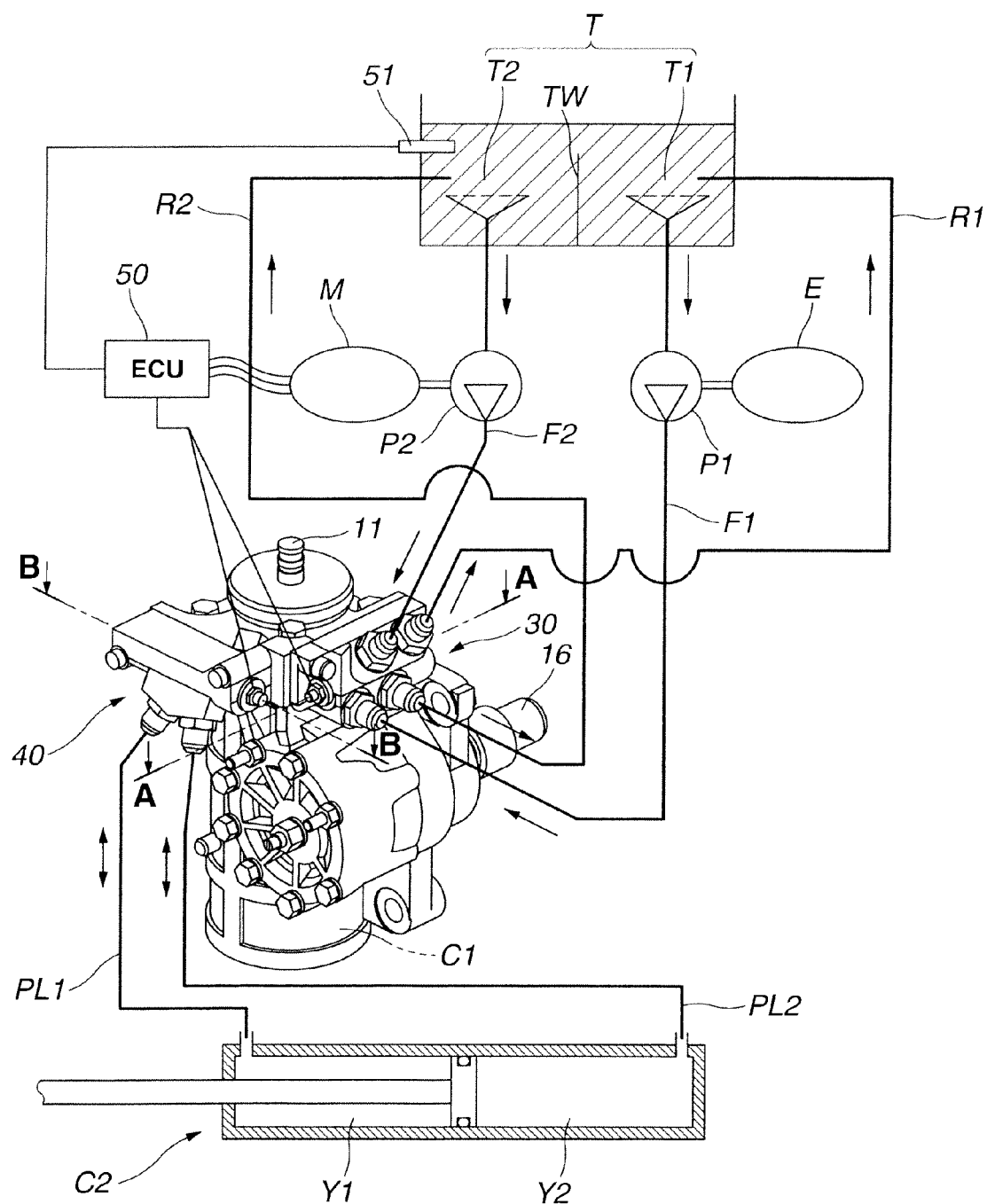
FIG. 1 is a system diagram showing a power steering apparatus according to an embodiment of the present invention and a fluid pressure circuit applied to the power steering apparatus.

FIG. 1 is a system diagram showing the power steering apparatus according to the embodiment and a specific construction of a fluid pressure circuit applied thereto.

As seen from FIGS. 1, 2 and 5, the power steering apparatus according to the embodiment includes steering mechanism 10, first power cylinder C1 built in steering mechanism 10, second power cylinder C2 provided separately from steering mechanism 10, control valve 20 built in steering mechanism 10, first pump P1 as a main pump, second pump P2 as a subsidiary pump, first reservoir tank T1, second reservoir tank T2, and electronic control unit (hereinafter referred to as "ECU") 50. Steering mechanism 10 serves for steering a first steerable road wheel (not shown) as a primary steerable road wheel by allowing first power cylinder C1 to amplify a steering effort inputted to input shaft 11 through a steering wheel (not shown) and allowing a pitman arm (not shown) connected to sector shaft 16 through output shaft 12 (see FIG. 2) to move leftward and rightward. First power cylinder C1 is a primary power cylinder (i.e., a power cylinder according to the present invention). Second power cylinder C2 is a supplementary power cylinder serving for steering a second steerable road wheel provided separately from the first steerable road wheel. Control valve 20 is operated to supply fluid pressure to pressure chambers X1, X2 (see FIG. 2) of first power cylinder C1 and pressure chambers Y1, Y2 of second power cylinder C2 in accordance with the steering effort and the steering direction inputted to input shaft 11. First pump P1 is driven by engine E as a first drive source of the power steering apparatus, and supplies working fluid (fluid pressure) to control valve 20. Second pump P2 is driven by electric motor M as a second drive source provided separately from the first drive source, and supplies the working fluid (fluid pressure) to control valve 20 instead of first pump P1 or in cooperation with first pump P1. First reservoir tank T1 mainly serves for reserving the working fluid to be supplied to and discharged from first pump P1. Second reservoir tank T2 mainly serves for reserving the working fluid to be supplied to and discharged from second pump P2. ECU 50 controls electric motor M in accordance with a running condition of the vehicle and an operating condition of the power steering apparatus.

Figure 5:
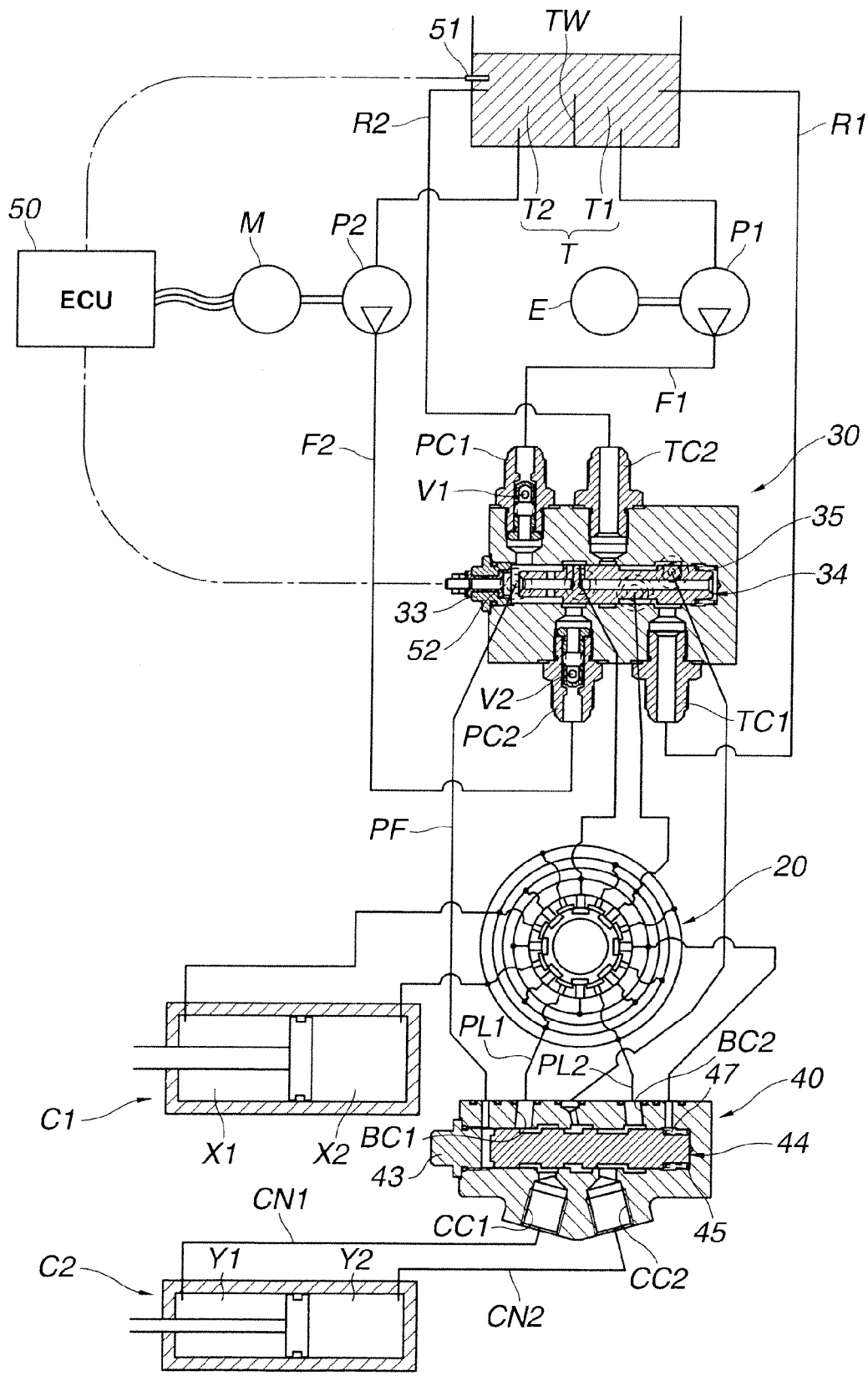
FIG. 5 is a fluid pressure circuit diagram of the power steering apparatus according to the embodiment of the present invention under a normal operation.

As shown in FIG. 5, circulating fluid passage changeover valve 30 is disposed between control valve 20 and respective pumps P1, P2. Circulating fluid passage changeover valve 30 is attached to steering mechanism 10 (specifically, control valve 20). Circulating fluid passage changeover valve 30 serves as a return passage changeover valve that carries out changeover between circulating fluid passages (i.e., return fluid passages) R1, R2 through which the working fluid supplied from respective pumps P1, P2 is returned to respective reservoir tanks T1, T2. In other words, in the power steering apparatus according to this embodiment, circulating fluid passage changeover valve 30 carries out not changeover between fluid communication of first pump P1 with control valve 20 and fluid communication of pump P2 with control valve 20, but only changeover between fluid communication of circulating fluid passage R1 with first reservoir tank T1 and fluid communication of circulating fluid passage R2 with second reservoir tank T2. With this construction, it is possible to simultaneously connect both pumps P1, P2 with control valve 20 and therefore allow concurrent use of both pumps P1, P2.

As shown in FIG. 5, cylinder changeover valve 40 (i.e., a supplementary cylinder changeover valve according to the present invention) is disposed between control valve 20 and second power cylinder C2. Similarly to circulating fluid passage changeover valve 30, cylinder changeover valve 40 is attached to steering mechanism 10 (specifically, control valve 20), and operated to establish fluid communication between control valve 20 and second power cylinder C2 and block the fluid communication therebetween.

First reservoir tank T1 and second reservoir tank T2 constitute an integral reservoir tank T. First and second reservoir tanks T1, T2 are fluidly communicated with each other on an upper side in a vertical direction, but are separated from each other by partition wall TW formed only on a lower side of reservoir tank T in the vertical direction. Partition wall TW upward extends from an inner bottom surface of reservoir tank T in the vertical direction. Specifically, when a fluid level of the working fluid within reservoir tank T is positioned at a height higher than a height of partition wall TW, both reservoir tanks T1, T2 share the working fluid with each other. On the other hand, when a fluid level of the working fluid within reservoir tank T is positioned at a height lower than the height of partition wall TW, respective reservoir tanks T1, T2 independently serve for supplying and discharging the working fluid. The height of the fluid level of the working fluid is detected by fluid level sensor 51 disposed at substantially the same height as the height of partition wall TW. Owing to detection of the height of the fluid level by fluid level sensor 51, it is possible to detect abnormality in a fluid pressure circuit of the power steering apparatus. In a case where the fluid level of the working fluid is positioned at a height that is not detected by fluid level sensor 51, it can be judged that abnormality occurs in any portion of the fluid pressure circuit and leakage of the working fluid is caused in the portion.

Figure 2:
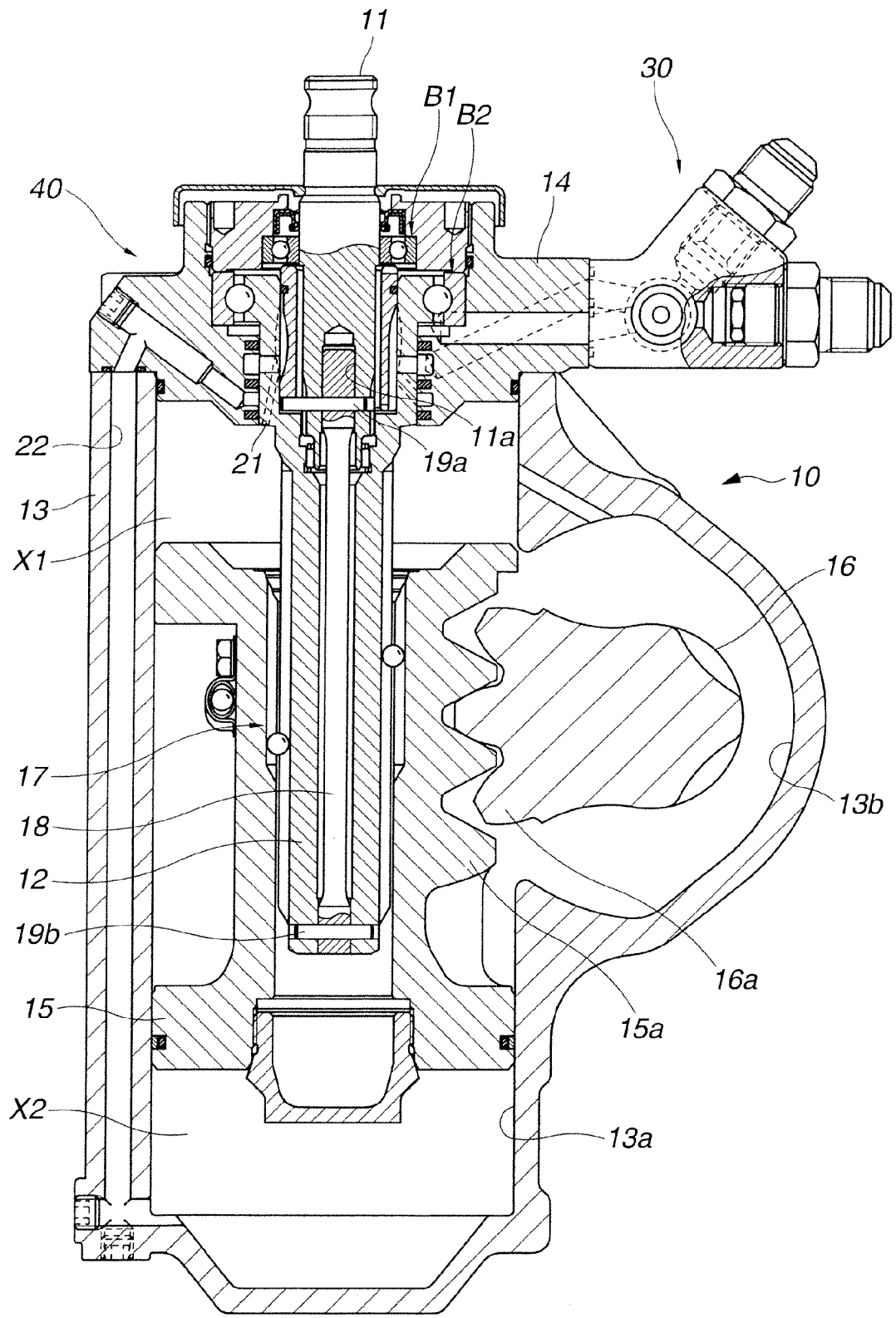
FIG. 2 is a vertical cross section of the power steering apparatus as shown in FIG. 1.

FIG. 2 is a cross section of steering mechanism 10, taken in an axial direction thereof, and shows a construction of steering mechanism 10.

As shown in FIG. 2, steering mechanism 10 includes cylinder housing 13 constituting first power cylinder C1 inside thereof, and valve housing 14 constituting control valve 20 inside thereof. Cylinder housing 13 and valve housing 14 abut on each other to form a unitary housing.

Cylinder housing 13 is formed into a generally cylindrical shape having a closed axial end. Cylinder housing 13 includes cylinder chamber 13a in which piston 15 is disposed to be moveable in an axial direction of cylinder chamber 13a. Piston 15 divides cylinder chamber 13a into a pair of pressure chambers, i.e., first pressure chamber X1 for rightward steering and second pressure chamber X2 for leftward steering. Further, cylinder housing 13 includes sector shaft accommodating chamber 13b disposed on the side of cylinder chamber 13a. Disposed within sector shaft accommodating chamber 13b is a part of sector shaft 16 connected with the pitman arm (not shown). That is, sector shaft 16 is arranged such that an axis thereof extends perpendicular to cylinder chamber 13a, and is connected with the first steerable road wheel (not shown) through the pitman arm.

Piston 15 has a generally cylindrical shape and rack portion 15a with three teeth on a portion of an outer periphery thereof which is opposed to sector shaft 16. Specifically, rack portion 15a meshes with toothed portion 16a formed on sector shaft 16 so that the axial movement of piston 15 is converted into a rotational movement of sector shaft 16 to thereby provide the first steerable road wheel with a steering angle. Further, piston 15 is connected to one axial end portion of generally cylindrical output shaft 12 through ball screw mechanism 17. Output shaft 12 is disposed within cylinder chamber 13a along the axial direction of cylinder chamber 13a. Output shaft 12 is rotated to thereby allow the axial movement of piston 15.

Valve housing 14 is mounted to an open axial end of cylinder housing 13 which is located on an opposite side of the closed axial end. Input shaft 11 is disposed within valve housing 14 in axial alignment with output shaft 12. One axial end portion of input shaft 11 is inserted into one axial end portion of output shaft 12. Input shaft 11 and output shaft 12 are connected with each other through torsion bar 18. One axial end portion of torsion bar 18 is accommodated in torsion bar accommodating hole 11a formed in the one axial end portion of input shaft 11, and is connected with input shaft 11 through fastener pin 19a. Torsion bar 18 extends in output shaft 12, and has the other axial end portion connected with the other axial end portion of output shaft 12 through fastener pin 19b.

Input shaft 11 is rotatably supported on valve housing 14 through bearing B1 disposed within valve housing 14. Output shaft 12 is rotatably supported on valve housing 14 through bearing B2 integrally formed with the one axial end portion of output shaft 12. Further, the other axial end portion of input shaft 11 projects outwardly from valve housing 14, and is connected to the steering wheel (not shown).

When input shaft 11 is rotated by rotationally operating the steering wheel, the rotation of input shaft 11 is transmitted to output shaft 12 through torsion bar 18, and at the same time, the rotational movement of output shaft 12 is converted into an axial movement of piston 15. The axial movement of piston 15 is then converted into a rotational movement of sector shaft 16, so that the first steerable road wheel is steered.

At this time, the fluid pressure supplied from respective pumps P1, P2 is selectively supplied to one of pressure chambers X1, X2 of first power cylinder C1 through control valve 20. As a result, a differential pressure between the fluid pressure in pressure chamber X1 and the fluid pressure in pressure chamber X2 occurs to thereby assist the steering effort.

Control valve 20 is a so-called rotary valve. Control valve 20 serves as a valve mechanism that is operated to open in accordance with an amount of torsion of torsion bar 18 which is determined on the basis of relative rotation of input shaft 11 and output shaft 12, and perform supply of the working fluid to first power cylinder C1 and second power cylinder C2 and discharge of the working fluid therefrom. Such control valve 20 itself is well known in the art (for instance, see Japanese Patent Application Unexamined Publication No. 2006-298284), and therefore, detailed explanations therefor are omitted. Control valve 20 is connected to first pressure chamber X1 of first power cylinder C1 which serves for rightward steering, through first communication passage 21 extending through output shaft 12. Control valve 20 is also connected to second pressure chamber X2 of first power cylinder C1 which serves for leftward steering, through second communication passage 22 continuously extending through both valve housing 14 and cylinder housing 13.

Figure 3A:
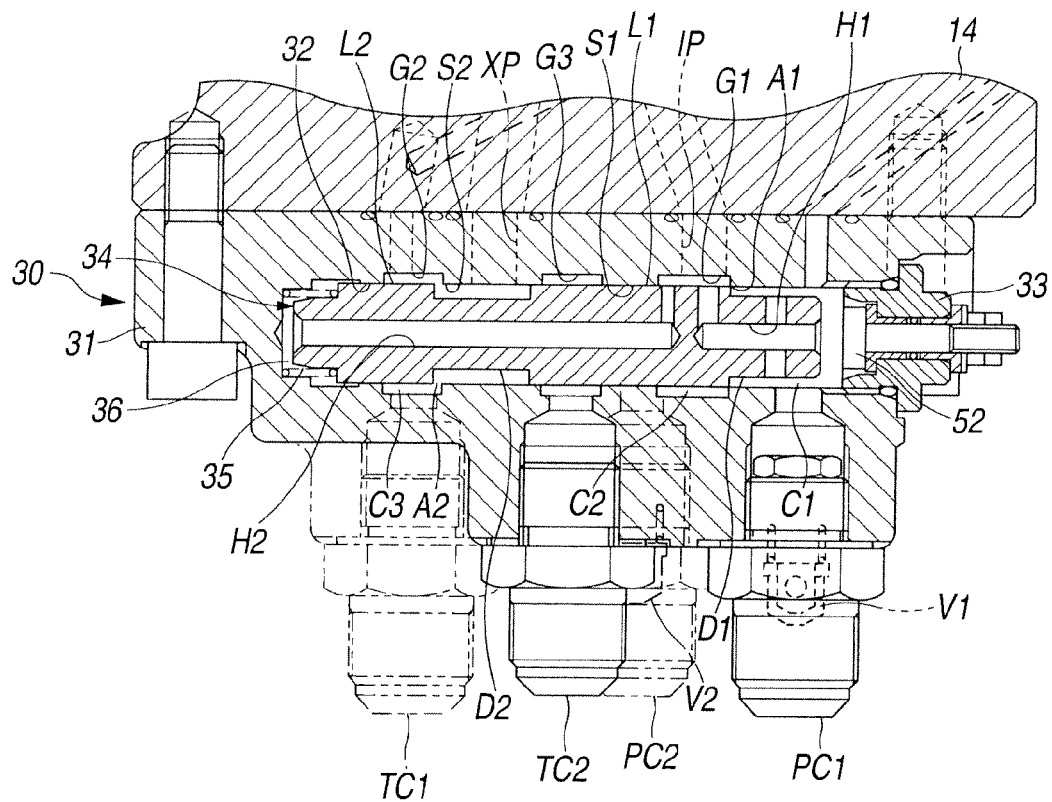
FIG. 3A is a cross section of the power steering apparatus, taken along line A-A of FIG. 1, and shows an operating position of a circulating fluid passage changeover valve under a condition that the power steering apparatus is normally operated.
Figure 3B:
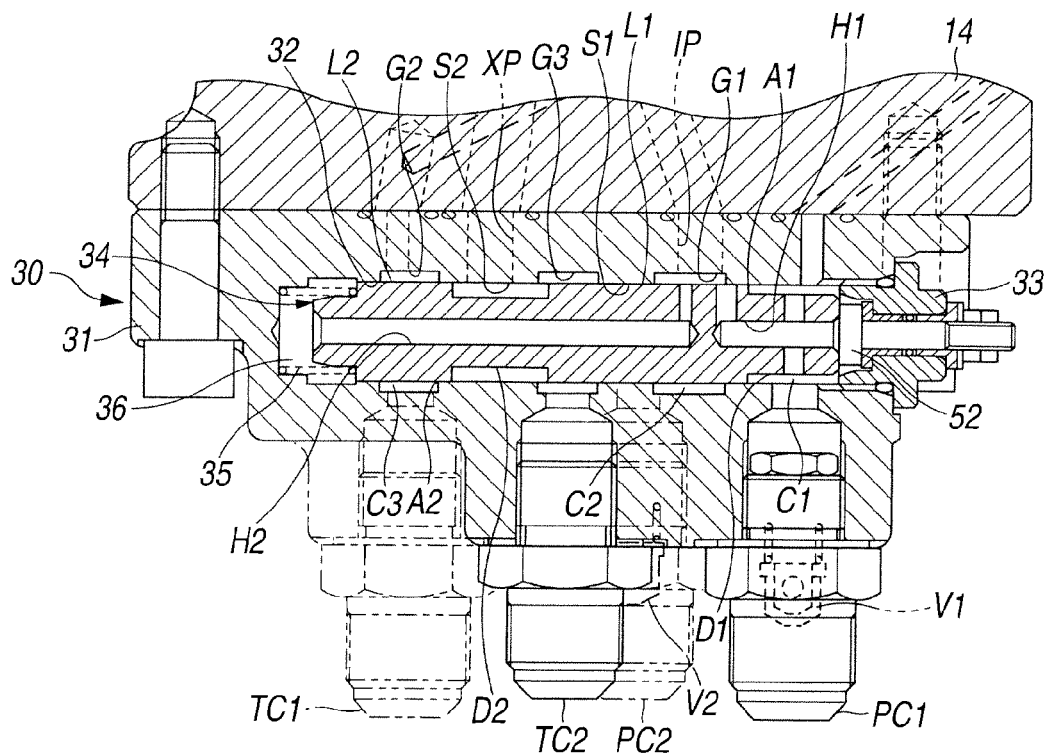
FIG. 3B is a cross section of the power steering apparatus, taken along line A-A of FIG. 1, and shows an operating position of the circulating fluid passage changeover valve under a condition that an engine is stopped.

FIG. 3A and FIG. 3B each are an enlarged cross section of an essential part of circulating fluid passage changeover valve 30, taken along line A-A of FIG. 1. FIG. 3A shows an operating position of circulating fluid passage changeover valve 30 under a condition that the power steering apparatus is normally operated. FIG. 3B shows an operating position of circulating fluid passage changeover valve 30 under a condition that engine E is stopped.

Circulating fluid passage changeover valve 30 includes valve body 31 having one open end and the other closed end in a longitudinal direction thereof. Circulating fluid passage changeover valve 30 has valve element accommodating bore 32 that is opened to an outer surface of valve body 31 at one axial end thereof. Plug 33 is disposed so as to cover the one axial end of valve element accommodating bore 32. Spool-shaped valve element (hereinafter referred to simply as "spool") 34 is disposed within valve element accommodating bore 32 so as to be slidably moveable along an axial direction of valve element accommodating bore 32. Spool 34 has first land L1 and second land L2 on an outer periphery thereof which are arranged to establish and block fluid communication between multiple ports PC1, etc. as explained later in operating positions of spool 34 along the axial direction of valve element accommodating bore 32. Valve spring 35 (i.e., a biasing member according to the present invention) is installed between one axial end of spool 34 and the other axial end (i.e., a bottom) of valve element accommodating bore 32, and always biases spool 34 toward plug 33. Thus constructed circulating fluid passage changeover valve 30 is actuated by pilot pressure, i.e., fluid pressure of the working fluid which is supplied from first and second pumps P1, P2.

Valve body 31 is disposed on the side of control valve 20, and connected to valve housing 14. Valve body 31 has, on a side thereof, first pump connecting port PC1, second pump connecting port PC2, introduction port IP, discharge port XP, first tank connecting port TC1, and second tank connecting port TC2 which extend through valve body 31 so as to be exposed to valve element accommodating bore 32. First pump connecting port PC1 serves for introducing the working fluid pressure supplied from first pump P1 into valve element accommodating bore 32. Second pump connecting port PC2 serves for introducing the working fluid pressure supplied from second pump P2 into valve element accommodating bore 32. Introduction port IP serves for introducing the working fluid pressure supplied from one of first and second pumps P1, P2 or both thereof into control valve 20. Discharge port XP serves for introducing the working fluid pressure discharged from control valve 20 into valve element accommodating bore 32. First tank connecting port TC1 serves for circulating the working fluid within valve element accommodating bore 32 to first reservoir tank T1. Second tank connecting port TC2 serves for circulating the working fluid within valve element accommodating bore 32 to second reservoir tank T2. First check valve V1 and second check valve V2 are respectively disposed within first pump connecting port PC1 and second pump connecting port PC2, and suppress backflow of the working fluid introduced from respective pumps P1, P2 into valve element accommodating bore 32.

More specifically, in a condition that the power steering apparatus according to the embodiment is normally operated, the fluid pressure of the working fluid supplied from first pump P1 is applied to one axial end surface (i.e., a pressure receiving surface) of spool 34 on the side of plug 33. Owing to the application of the fluid pressure, spool 34 is urged to leftward move to an operating position (hereinafter referred to as "a first axial position") as shown in FIG. 3A, against the biasing force of valve spring 35. In the first axial position, first annular passage C1 is defined between an inner peripheral surface of valve body 31 which defines valve element accommodating bore 32, and first reduced diameter portion D1 formed on one axial end portion of spool 34 on the side of plug 33. Further, fine clearance A1 is formed between first land L1 located axially adjacent to first reduced diameter portion D1, and first seal portion S1 formed on the inner peripheral surface of valve body 31 which defines valve element accommodating bore 32. Further, annular groove G1 is formed on the inner peripheral surface of valve body 31 axially adjacent to first seal portion S1. Spool 34 is also formed with first inner passage H1 and second inner passage H2 which extend through spool 34. First inner passage H1 extends from the one axial end surface of spool 34 on the side of plug 33 along an axial direction of spool 34, and extends in a radial direction of spool 34 so as to be opened to an outer peripheral surface of spool 34. First inner passage H1 communicates annular groove G1 and first annular passage C1 with each other. Second inner passage H2 extends from the other axial end surface of spool 34 along the axial direction of spool 34, and always communicates annular groove G1 and back-pressure chamber 36 in which valve spring 35 is accommodated, with each other. Second inner passage H2 exclusively serves for absorbing volumetric change in back-pressure chamber 36 during the axial movement of spool 34 within valve element accommodating bore 32. First pump connecting port PC1 and introduction port IP are communicated with each other through first annular passage C1 and fine clearance A1, or through first inner passage H1 and annular groove G1. Fine clearance A1 acts as an orifice, and there is generated a pressure difference between fluid pressure within first annular passage C1 located on one side of the orifice, and fluid pressure within annular groove G1 located on the other side of the orifice. In contrast, second pump connecting port PC2 and introduction port IP are always communicated with each other through second annular passage C2 defined between first land L1 and annular groove G1. The working fluid thus introduced from respective pumps P1, P2 into valve element accommodating bore 32 through first and second pump connecting ports PC1, PC2 can be prevented from flowing back through respective pump connecting ports PC1, PC2 by respective check valves V1, V2. As a result, a whole amount of the working fluid can be supplied to control valve 20 through introduction port IP.

In addition, when spool 34 is placed in the first axial position, third annular passage C3 is defined between second reduced-diameter portion D2 formed between first and second lands L1, L2 and second seal portion S2 formed on the inner peripheral surface of valve body 31 which defines valve element accommodating bore 32. Further, clearance A2 is formed between second land L2 and second seal portion S2. Annular groove G2 (i.e., a first changeover groove according to the present invention) is formed on the inner peripheral surface of valve body 31 which defines valve element accommodating bore 32, adjacent to second seal portion S2 in the axial direction of valve element accommodating bore 32. Annular groove G2 is disposed on an outer radial side of second land L2 in a radial direction of spool 34. Discharge port XP and first tank connecting port TC1 are communicated with each other through third annular passage C3, clearance A2 and annular groove G2. Annular groove G3 (i.e., a second changeover groove according to the present invention) is formed on the inner peripheral surface of valve body 31 which defines valve element accommodating bore 32, such that second seal portion S2 is located between annular grooves G2, G3. First land L1 is overlapped with an end portion of second seal portion S2 which is located on the side of annular groove G3, in the radial direction of spool 34. Therefore, fluid communication between discharge port XP (third annular passage C3) and second tank connecting port TC2 is blocked. As a result, the working fluid discharged from control valve 20 is circulated to only first reservoir tank T1 through first tank connecting port TC1.

In contrast, in a condition that engine E is stopped, spool 34 is urged to rightward move to an operating position (hereinafter referred to "a second axial position") as shown in FIG. 3B, against the biasing force of valve spring 35 due to no supply of the working fluid from first pump P1. When spool 34 is placed in the second axial position, the working fluid is not supplied from first pump P1, and first land L1 is radially overlapped with a portion of first seal portion S1 which is located on the side of annular groove G1. Therefore, fluid communication between first pump connecting port PC1 and introduction port IP is blocked. On the other hand, fluid communication between second pump connecting port PC2 and introduction port IP through second annular passage C2 is maintained. That is, in such a condition that engine E is stopped, only second pump connecting port PC2 can be communicated with introduction port IP.

In addition, when spool 34 is placed in the second axial position, second land L2 is radially overlapped with one end portion of second seal portion S2 which is located on the side of annular groove G2. Therefore, fluid communication between discharge port XP and first tank connecting port TC1 is blocked. On the other hand, fluid communication between discharge port XP and second tank connecting port TC2 is established through annular groove G3 and a clearance formed between first land L1 and the other end portion of second seal portion S2 which is located on the side of annular groove G3. As a result, the working fluid discharged from control valve 20 is circulated to only second reservoir tank T2 through second tank connecting port TC2.

Disposed on a radial inside of plug 33 is proximity switch 52 (i.e., a valve element position detecting sensor according to the present invention) which detects a proximity (contact) condition relative to spool 34, i.e., a position of spool 34 in the axial direction of valve element accommodating bore 32. Specifically, as shown in FIG. 3A, in a case where the one axial end of spool 34 is fully distant from proximity switch 52, ECU 50 (see FIG. 2) determines that spool 34 is placed in the above-described first axial position. As shown in FIG. 3B, in a case where the one axial end of spool 34 is fully close to proximity switch 52, ECU 50 determines that spool 34 is placed in the above-described second axial position.

Figure 4A:
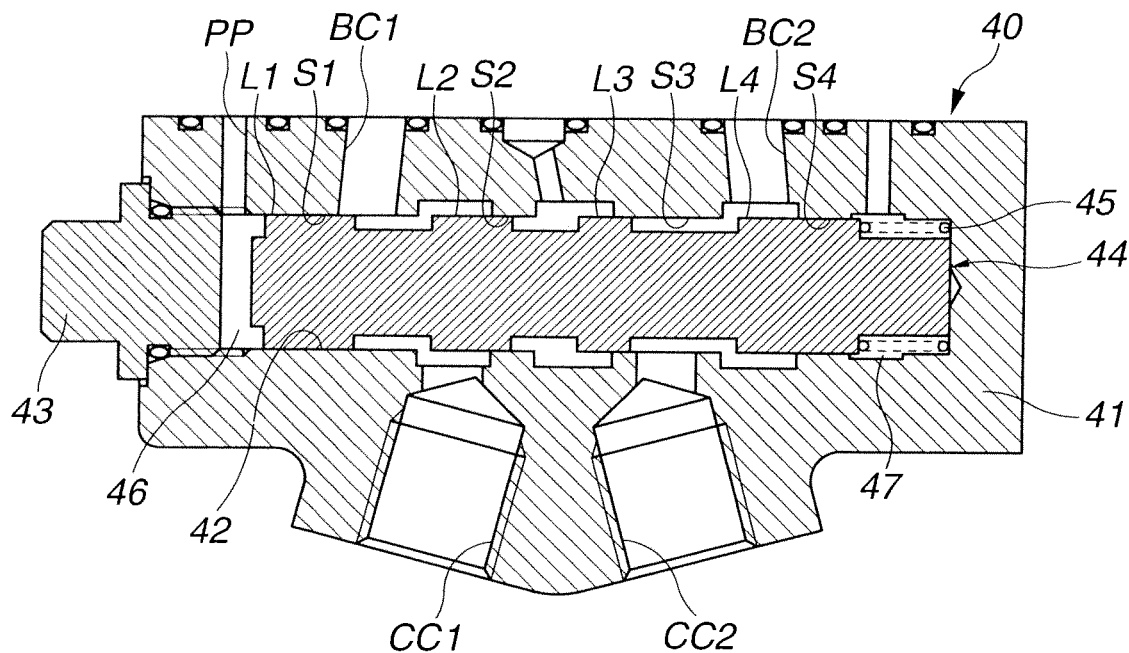
FIG. 4A is a cross section of the power steering apparatus, taken along line B-B of FIG. 1, and shows an operating position of a cylinder changeover valve under a condition that the power steering apparatus is normally operated.
Figure 4B:
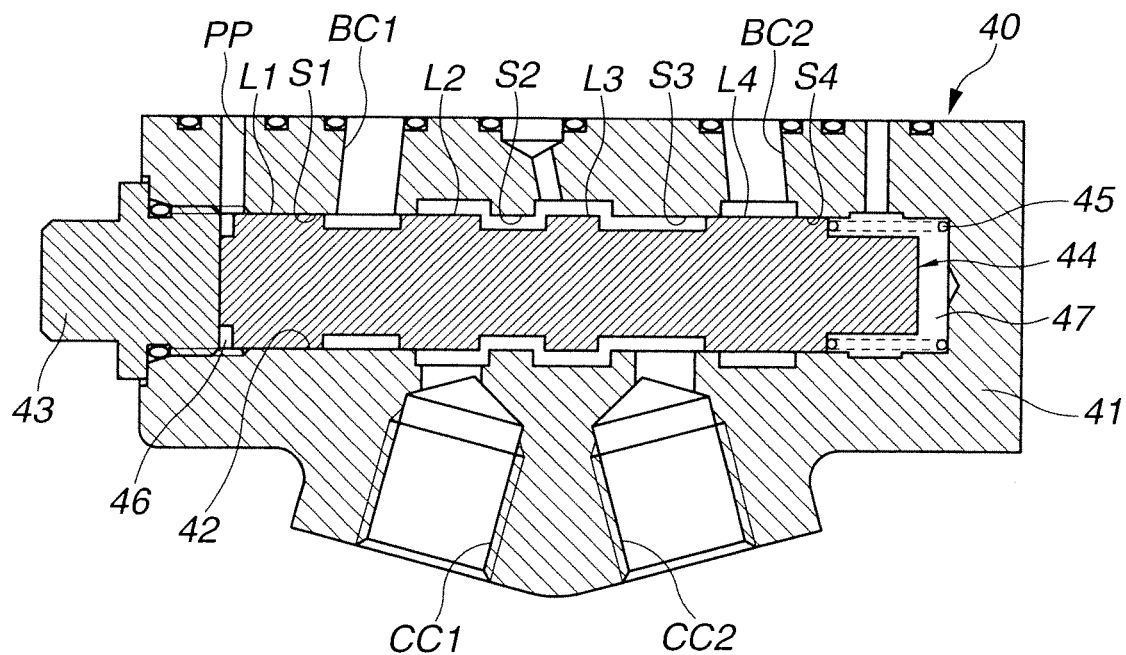
FIG. 4B is a cross section of the power steering apparatus, taken along line B-B of FIG. 1, and shows an operating position of a cylinder changeover valve under a condition that the engine is stopped.

FIG. 4A and FIG. 4B each are a cross section of the power steering apparatus, taken along line B-B of FIG. 1, and show cylinder changeover valve 40. FIG. 4A shows an operating position of cylinder changeover valve 40 under a condition that the power steering apparatus is normally operated. FIG. 4B shows an operating position of cylinder changeover valve 40 under a condition that engine E is stopped.

Cylinder changeover valve 40 includes valve body 41 having one open end and the other closed end in a longitudinal direction thereof. Cylinder changeover valve 40 has valve element accommodating bore 42 that is opened to an outer surface of valve body 41 at one axial end thereof. Plug 43 is disposed so as to cover the one axial end of valve element accommodating bore 42. First to fourth seal portions S1 to S4 are formed on an inner peripheral surface of valve body 41 which defines valve element accommodating bore 42. Spool 44 is disposed within valve element accommodating bore 42 so as to be slidably moveable along an axial direction of valve element accommodating bore 42. Spool 44 has first to fourth lands L1 to L4 on an outer peripheral surface thereof. These lands L1 to L4 are arranged to cooperate with seal portions S1 to S4 to establish and block fluid communication between multiple ports BC1, BC2, CC1, CC2 in operating positions of spool 44 along the axial direction of valve element accommodating bore 42. First valve connecting port BC1 is opened to first seal portion S1 and exposed to valve element accommodating bore 42. Second valve connecting port BC2 is formed between third seal portion S3 and fourth seal portion S4 and exposed to valve element accommodating bore 42. First cylinder connecting port CC1 is formed between first seal portion S1 and second seal portion S2 and exposed to valve element accommodating bore 42. Second cylinder connecting port CC2 is opened to third seal portion S1 and exposed to valve element accommodating bore 42. Pressure chamber 46 is defined within valve element accommodating bore 42 on the side of plug 43, into which the working fluid pressure from first pump P1 is introduced through fluid pressure introducing port PP. Back-pressure chamber 47 is defined within valve element accommodating bore 42 on the opposite side in which valve spring 45 is accommodated. Thus constructed cylinder changeover valve 40 is actuated by pilot pressure, i.e., the working fluid pressure which is supplied from first pump P1 to pressure chamber 46.

More specifically, in a case where engine E is in an operating condition and the fluid pressure circuit for first pump P1 is in a normal condition, fluid pressure supplied from first pump P1 is introduced into pressure chamber 46 through circulating fluid passage changeover valve 30 and fluid pressure introducing passage PF (see FIG. 5), and applied to an axial end surface (i.e., a pressure receiving surface) of spool 44 on the side of plug 43. Owing to the fluid pressure applied, as shown in FIG. 4A, spool 44 is urged to move to an operating position (i.e., a first axial position) that is located on the opposite side of plug 43 against the biasing force of valve spring 45. In the first axial position, first land L1, second land L2, third land L3 and fourth land L4 of spool 44 are radially overlapped with first seal portion S1, second seal portion S2, third seal portion S3 and fourth seal portion S4, respectively. Accordingly, fluid communication between first valve connecting port BC1 and first cylinder connecting port CC1, and fluid communication between second valve connecting port BC2 and second cylinder connecting port CC2 are each independently established. As a result, the working fluid is supplied from control valve 20 to one of pressure chambers Y1, Y2 of second power cylinder C2 according to the steering direction through cylinder changeover valve 40, and at the same time, the working fluid is discharged from the other of pressure chambers Y1, Y2 to control valve 20 through cylinder changeover valve 40.

On the other hand, in a case where engine E is in a stop condition or an abnormality occurs in the fluid pressure circuit for first pump P1, as shown in FIG. 4B, fluid pressure supplied from first pump P1 is not introduced into pressure chamber 46, and therefore, spool 44 is urged to move to an operating position (i.e., a second axial position) that is located on the side of plug 43 by the biasing force of valve spring 45. In the second axial position of spool 44, first land L1 and second land L2 of spool 44 are radially overlapped with first seal portion S1, and fourth land L4 of spool 44 is radially overlapped with third seal portion S3 and fourth seal portion S4. Accordingly, the fluid communication between first valve connecting port BC1 and first cylinder connecting port CC1 and the fluid communication between second valve connecting port BC2 and second cylinder connecting port CC2 are blocked. As a result, the working fluid is not supplied to respective pressure chambers Y1, Y2 of second power cylinder C2 nor discharged therefrom. Further, in the second axial position of spool 44, first cylinder connecting port CC1 and second cylinder connecting port CC2 are fluidly communicated with each other through a clearance between second land L2 and second seal portion S2, a clearance between third land L3 and second seal portion S2, and a clearance between third land L3 and third seal portion S3, so that pressure chambers Y1, Y2 are fluidly communicated with each other.

Figure 6:
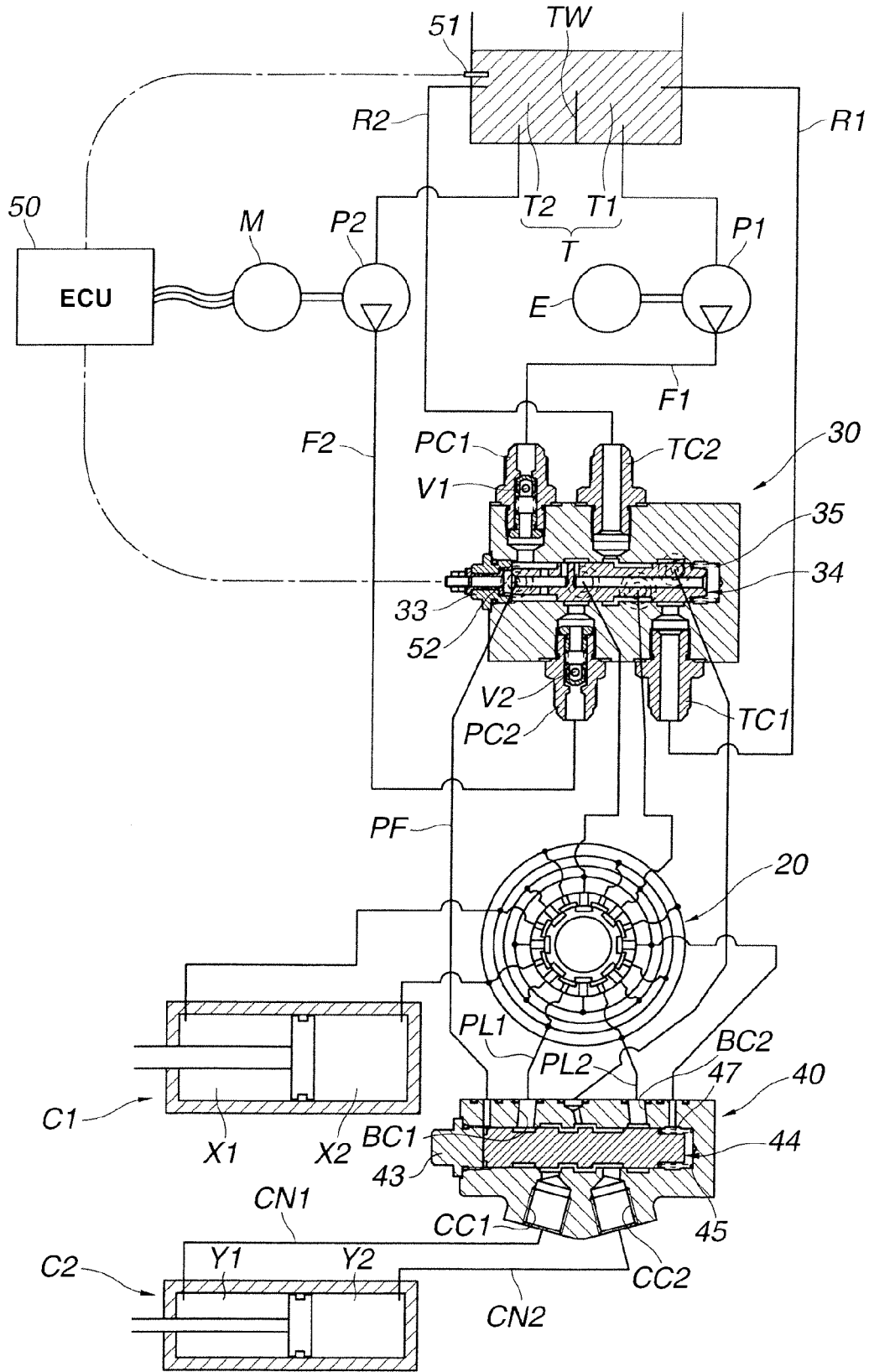
FIG. 6 is a fluid pressure circuit diagram of the power steering apparatus according to the embodiment of the present invention under a condition that the engine is stopped or abnormality occurs in a fluid pressure circuit for a first pump.
Figure 7:
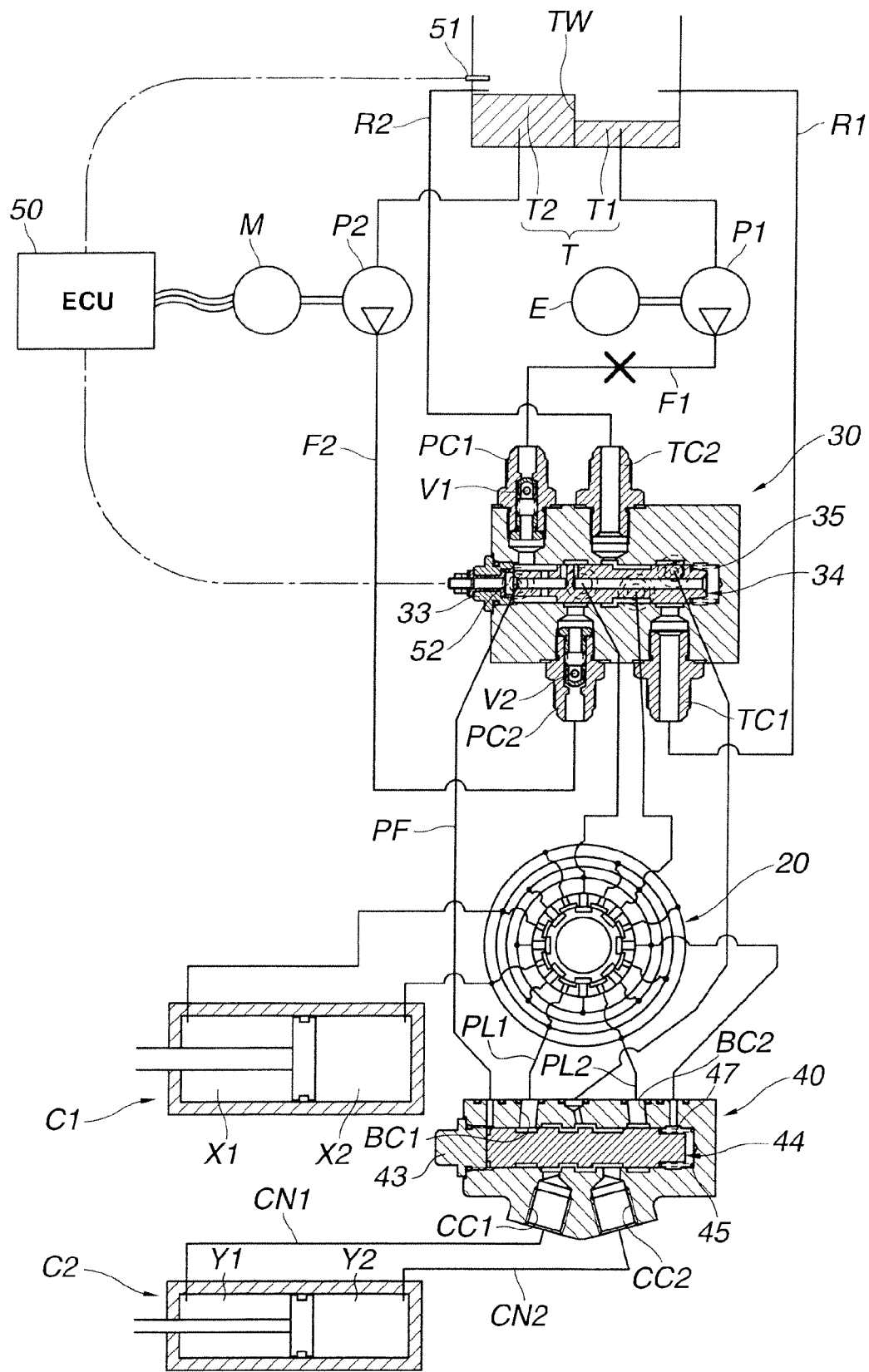
FIG. 7 is a fluid pressure circuit diagram of the power steering apparatus according to the embodiment of the present invention under a condition that a supply pipe for the first pump is broken.
Figure 8:
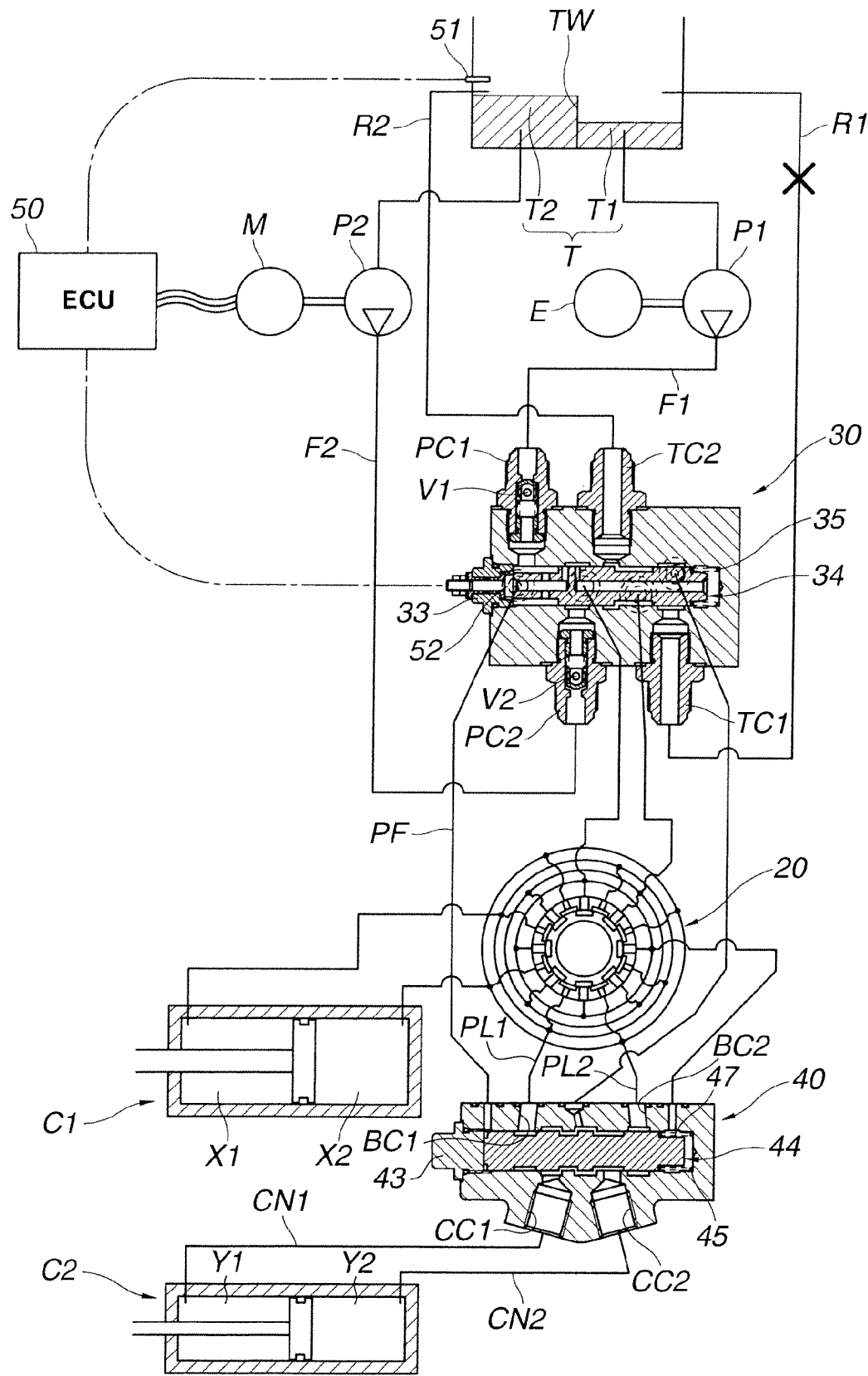
FIG. 8 is a fluid pressure circuit diagram of the power steering apparatus according to the embodiment of the present invention under a condition that a circulating fluid pipe for the first pump is broken.
Figure 9:
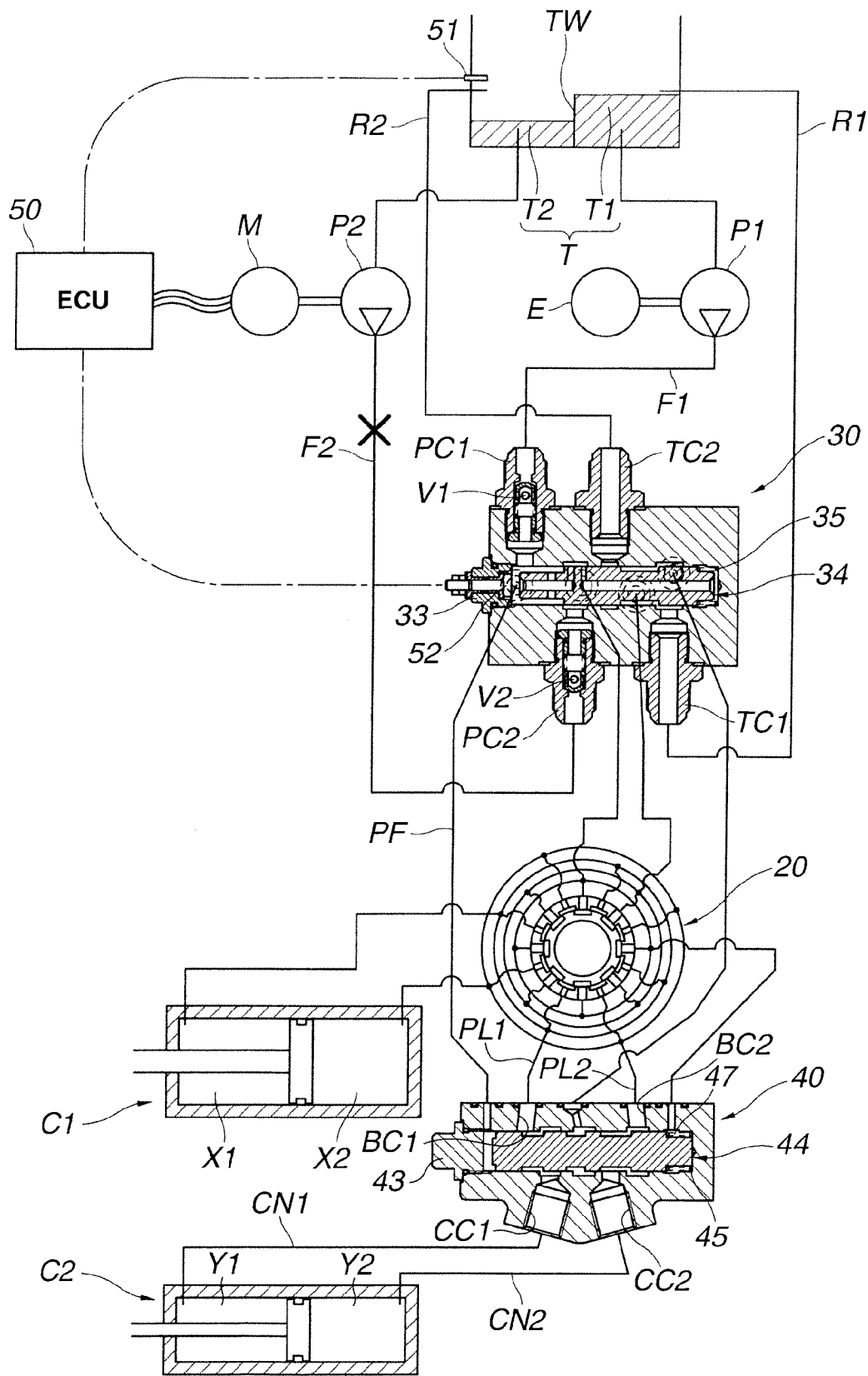
FIG. 9 is a fluid pressure circuit diagram of the power steering apparatus according to the embodiment of the present invention under a condition that a supply pipe for a second pump is broken.
Figure 10:
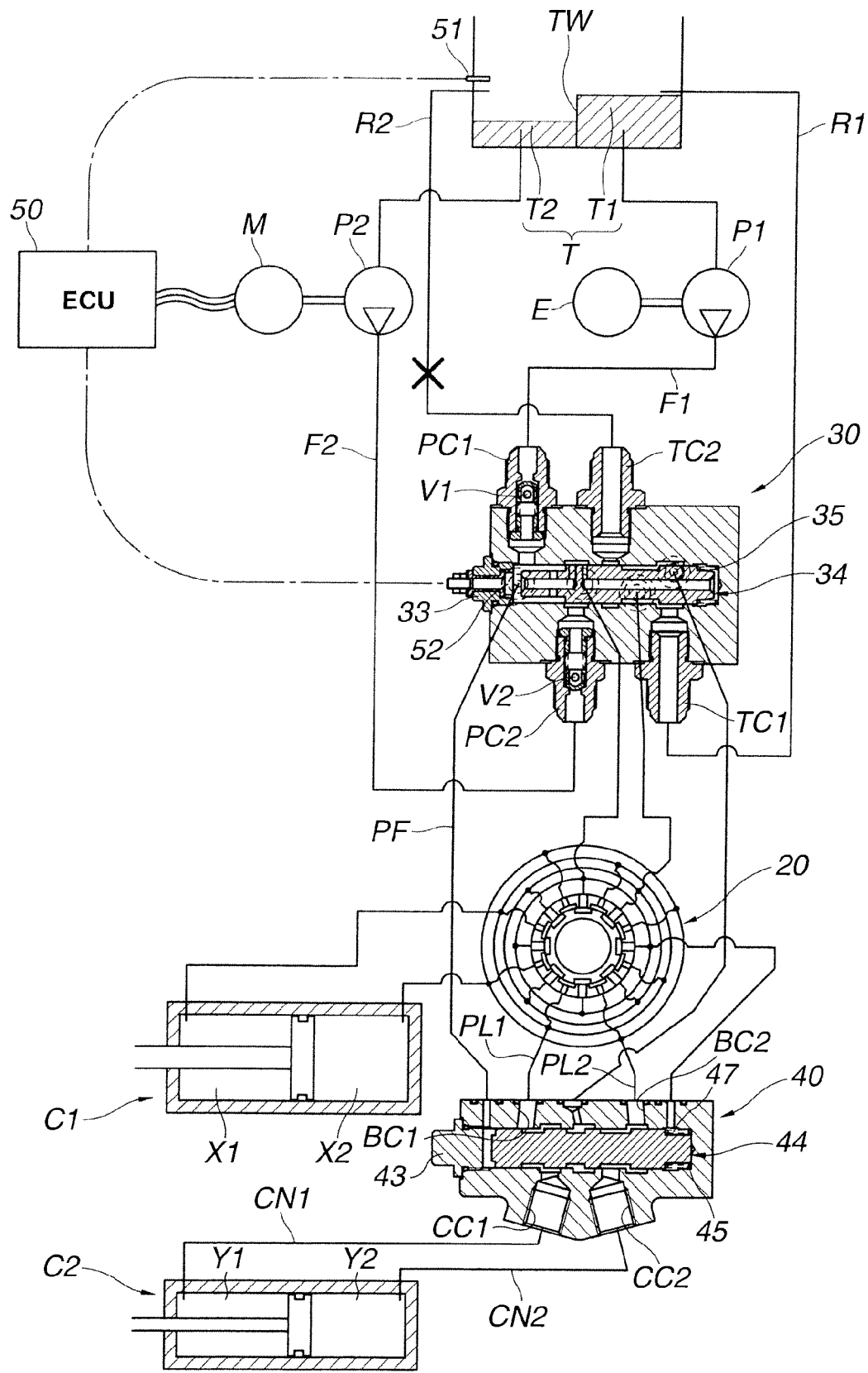
FIG. 10 is a fluid pressure circuit diagram of the power steering apparatus according to the embodiment of the present invention under a condition that a circulating fluid pipe for the second pump is broken.
Figure 11:
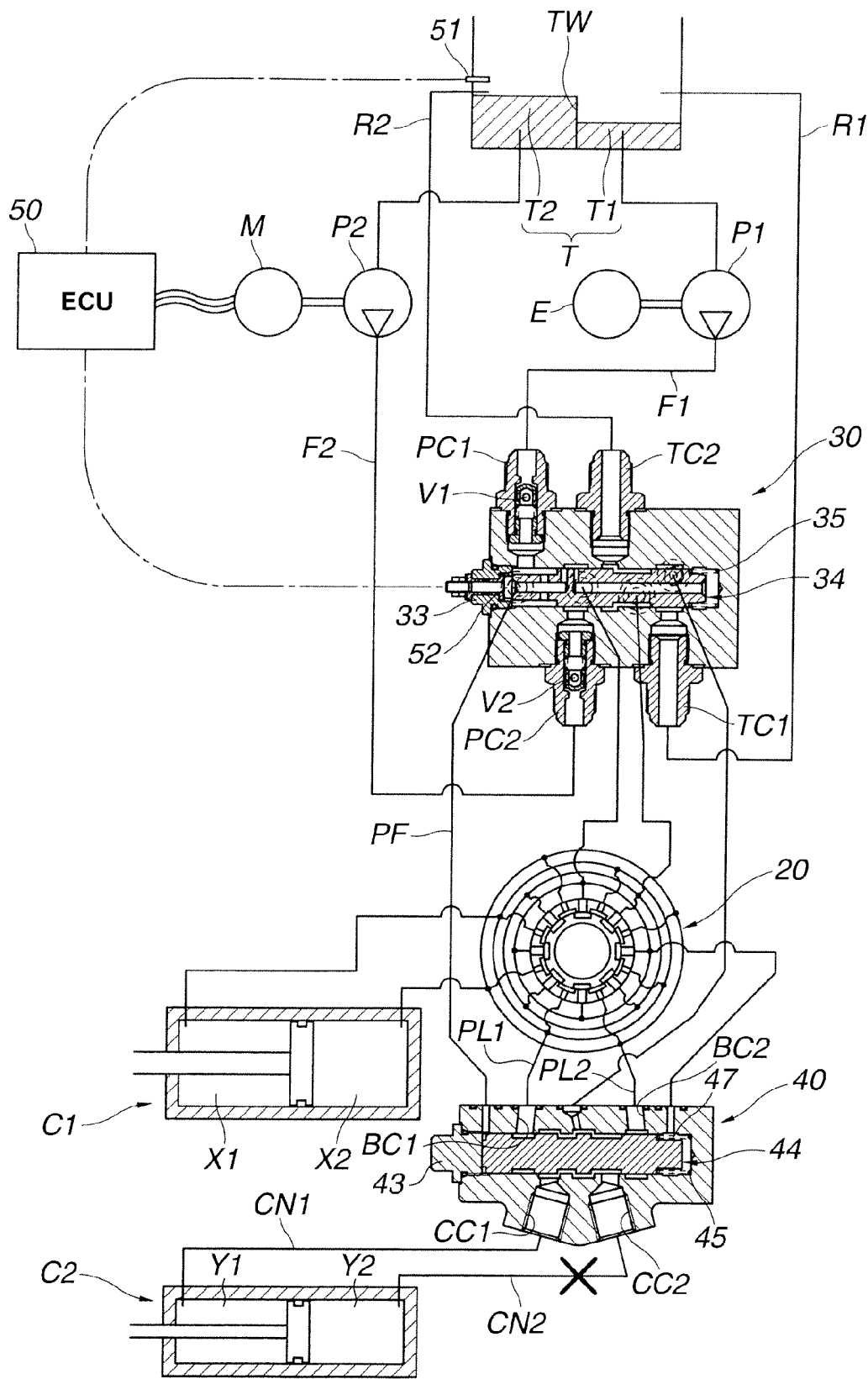
FIG. 11 is a fluid pressure circuit diagram of the power steering apparatus according to the embodiment of the present invention under a condition that a connection pipe between the cylinder changeover valve and a second power cylinder is broken.

Referring to FIG. 5 to FIG. 11, supply and discharge of the working fluid which are carried out in the power steering apparatus according to the embodiment under operating conditions which are different from each other will be explained hereinafter. FIG. 5 is a fluid pressure circuit diagram of the power steering apparatus according to the embodiment under a normal operating condition. FIG. 6 is a fluid pressure circuit diagram of the steering apparatus according to the embodiment under a condition that engine E is stopped. FIG. 7 is a fluid pressure circuit diagram of the power steering apparatus according to the embodiment under a condition that a supply pipe for first pump P1 is broken. FIG. 8 is a fluid pressure circuit diagram of the power steering apparatus according to the embodiment under a condition that a circulating fluid pipe for first pump P1 is broken. FIG. 9 is a fluid pressure circuit diagram of the power steering apparatus according to the embodiment under a condition that a supply pipe for second pump P2 is broken. FIG. 10 is a fluid pressure circuit diagram of the power steering apparatus according to the embodiment under a condition that a circulating fluid pipe for second pump P2 is broken. FIG. 11 is a fluid pressure circuit diagram of the power steering apparatus according to the embodiment under a condition that a supply/discharge pipe connected to second power cylinder C2 is broken.

In a condition that the power steering apparatus according to the embodiment is normally operated, as shown in FIG. 5, reservoir tank T reserves a sufficient amount of working fluid which can be detected by fluid level sensor 51, and the amount of working fluid is shared by the fluid pressure circuits for respective pumps P1, P2. In a case where steering operation is carried out by a driver of the vehicle, the working fluid is supplied to circulating fluid passage changeover valve 30 by only first pump P1 or both first pump P1 and second pump P2 in accordance with an operating condition of the vehicle. At this time, in circulating fluid passage changeover valve 30, spool 34 is placed in the first axial position by the pilot pressure supplied from first pump P1 as described above, and therefore, the working fluid discharged from both pumps P1, P2 is supplied to control valve 20. Then, the working fluid is supplied from control valve 20 to one of pressure chambers X1, X2 of first power cylinder C1 on the basis of the open state (i.e., the operating position) in accordance with the steering operation. On the other hand, the working fluid is discharged from the other of pressure chambers X1, X2 to circulating fluid passage changeover valve 30 through control valve 20. At this time, in circulating fluid passage changeover valve 30, spool 34 is placed in the first axial position in which discharge port XP is communicated with only first reservoir tank T1 and is not communicated with second reservoir tank T2. Therefore, a whole amount of the working fluid discharged from first power cylinder C1 is circulated to first reservoir tank T1 through first tank connecting port TC1 and first circulating fluid passage R1.

Further, since engine E is in an operating condition, and the fluid pressure circuit for first pump P1 is in a normal condition, the working fluid pressurized by first pump P1 is also introduced into pressure chamber 46 of cylinder changeover valve 40. At this time, in cylinder changeover valve 40, spool 44 is placed in the first axial position by the pilot pressure supplied from first pump P1 as explained above. Therefore, on the basis of the open state (i.e., the operating position) of control valve 20, an amount of the working fluid is supplied from control valve 20 to one of pressure chambers Y1, Y2 of second power cylinder C2 according to the steering direction, through one of first and second supply-discharge passages PL1, PL2 connecting control valve 20 and cylinder changeover valve 40 with each other, and one of first and second communicating passages CN1, CN2 connecting cylinder changeover valve 40 and second power cylinder C2 with each other. On the other hand, on the basis of the supplied amount of the working fluid, the working fluid is discharged from the other of pressure chambers Y1, Y2 to control valve 20 through the other of first and second communicating passages CN1, CN2 and the other of first and second supply-discharge passages PL1, PL2. The working fluid discharged is circulated to first reservoir tank T1 through circulating fluid passage changeover valve 30. Specifically, as shown in FIG. 5, supply-discharge passages PL1, PL2 extend between control valve 20 and valve connecting ports BC1, BC2 of cylinder changeover valve 40, respectively. Communicating passages CN1, CN2 extend between pressure chambers Y1, Y2 of second power cylinder C2 and cylinder connecting ports CC1, CC2 of cylinder changeover valve 40, respectively.

Next, in a case where engine E is in the stop condition such as idling stop or engine stall, as shown in FIG. 6, the working fluid is not supplied from first pump P1 to circulating fluid passage changeover valve 30, and therefore, spool 34 of circulating fluid passage changeover valve 30 is urged to move to the above-described second axial position in which the one axial end of spool 34 is contacted with plug 33 (proximity switch 52). ECU 50 receives a detection signal from proximity switch 52, and determines that spool 34 is placed in the second axial position. ECU 50 then outputs a driving signal to electric motor M to thereby drive second pump P2 to supply the working fluid to circulating fluid passage changeover valve 30. At this time, in circulating fluid passage changeover valve 30, spool 34 is placed in the second axial position in which only second pump connecting port PC2 is communicated with introduction port IP and discharge port XP is communicated with second tank connecting port TC2. Therefore, a whole amount of the working fluid supplied through second pump connecting port PC2 is introduced into control valve 20 through introduction port IP. On the basis of the open state (the operating position) of control valve 20, an amount of the working fluid is supplied to one of pressure chambers X1, X2 of first power cylinder C1, and on the basis of the supplied amount of the working fluid, the working fluid is discharged from the other of pressure chambers X1, X2 to circulating fluid passage changeover valve 30 through control valve 20. The working fluid discharged is circulated to second reservoir tank T2 through second tank connecting port TC2 and second circulating fluid passage R2.

Further, since first pump P1 is not driven in a case where engine E is in the stop condition, the pilot pressure is not introduced into pressure chamber 46 of cylinder changeover valve 40 so that spool 44 is urged to move to the second axial position by the biasing force of valve spring 45. As a result, fluid communication between control valve 20 and pressure chambers Y1, Y2 of second power cylinder C2 is blocked. That is, in the engine stop condition, second power cylinder C2 is not actuated so that steering assist by second power cylinder C2 is not carried out.

Next, a case where abnormality occurs in the fluid pressure circuit for first pump P1 is explained. FIG. 7 shows the case where there occurs breakage in first supply passage F1 through which the working fluid pressurized by first pump P1 is supplied. As shown in FIG. 7, when first supply passage F1 is broken at a portion as indicated by X, the working fluid leaks (flows out) from the portion X to thereby cause reduction of an amount of the working fluid in first reservoir tank T1 of reservoir tank T. Specifically, firstly, a common part of the working fluid in reservoir tank T (i.e., a part of the working fluid which is located at a liquid level higher than a height of partition wall TW) flows out from first reservoir tank T1, and then, only a specific part of the working fluid in first reservoir tank T1 (i.e., a part of the working fluid which is located at a liquid level lower than a height of partition wall TW) flows out from first reservoir tank T1. The reduction of the amount (i.e., liquid level) of the working fluid in first reservoir tank T1 is detected by liquid level sensor 51. ECU 50 receives a detection signal from liquid level sensor 51, and determines that the amount of the working fluid in first reservoir tank T1 is reduced. At this time, in a case where second pump P2 is in a driven state, ECU 50 stops the operation of electric motor M while maintaining a driven state of first pump P1, thereby ensuring an amount of the working fluid in second reservoir tank T2. After that, first reservoir tank T1 becomes empty due to leakage of the working fluid from the broken portion of first supply passage F1, whereby supply of the working fluid by first pump P1 is not carried out so that spool 34 of circulating fluid passage changeover valve 30 is urged to move from the first axial position to the second axial position against the biasing force of valve spring 35. As a result, the one axial end of spool 34 is contacted with proximity switch 52, and ECU 50 receives a detection signal from proximity switch 52 and determines that spool 34 is placed in the second axial position. ECU 50 then outputs a driving signal to electric motor M to thereby drive second pump P2.

After that, similarly to the case where engine E is in the stop condition as shown in FIG. 6, the working fluid supplied by only second pump P2 is introduced into control valve 20 through circulating fluid passage changeover valve 30. Then, on the basis of the open state (the operating position) of control valve 20, an amount of the working fluid is supplied to one of pressure chambers X1, X2 of first power cylinder C1, and on the basis of the supplied amount of the working fluid, the working fluid is discharged from the other of pressure chambers X1, X2 to circulating fluid passage changeover valve 30 through control valve 20. The working fluid discharged is circulated to second reservoir tank T2 through second tank connecting port TC2 communicated with discharge port XP in circulating fluid passage changeover valve 30, and second circulating fluid passage R2. That is, a whole amount of the working fluid supplied from second pump P2 except for a slight amount of the working fluid leaking from first check valve V1 is returned to second reservoir tank T2 without being returned to first reservoir tank T1. As a result, it is possible to maintain the steering assist by driving second pump P2.

Further, since the working fluid is not reserved in first reservoir tank T1, even when first pump P1 is driven by operating engine E, the pilot pressure cannot be introduced into pressure chamber 46 of cylinder changeover valve 40 so that spool 44 is urged to move from the first axial position to the second axial position by the biasing force of valve spring 45 similarly to the case where engine E is in the stop condition as shown in FIG. 6. As a result, fluid communication between control valve 20 and respective pressure chambers Y1, Y2 of second power cylinder C2 is blocked to thereby provide no steering assist by second power cylinder C2.

Referring to FIG. 8, a case where breakage occurs in first circulating fluid passage R1 of the fluid pressure circuit for first pump P1 is explained. As shown in FIG. 8, when first circulating fluid passage R1 is broken at a portion as indicated by X, the working fluid leaks (flows out) from the portion X to thereby cause reduction of an amount of the working fluid in first reservoir tank T1. The reduction of the amount of the working fluid in first reservoir tank T1 is detected by liquid level sensor 51, and ECU 50 receives a detection signal from liquid level sensor 51 and determines that the amount of the working fluid in first reservoir tank T1 is reduced. At this time, in a case where second pump P2 is in a driven state, ECU 50 stops the operation of electric motor M while maintaining a driven state of first pump P1, thereby ensuring an amount of the working fluid in second reservoir tank T2. After that, at a time at which first reservoir tank T1 becomes empty due to leakage of the working fluid from the broken portion of first circulating fluid passage R1, circulating fluid passage changeover valve 30 is moved from the first axial position to the second axial position so that the one axial end of spool 34 is contacted with proximity switch 52. ECU 50 receives a detection signal from proximity switch 52, and determines that spool 34 is placed in the second axial position. ECU 50 then outputs a driving signal to electric motor M to thereby drive second pump P2. As a result, the working fluid supplied by only second pump P2 is introduced into one of pressure chambers X1, X2 of first power cylinder C1 through control valve 20, and is discharged from the other of pressure chambers X1, X2 to circulating fluid passage changeover valve 30 through control valve 20. The working fluid discharged is circulated to second reservoir tank T2 through second tank connecting port TC2 communicated with discharge port XP in circulating fluid passage changeover valve 30, and second circulating fluid passage R2. A whole amount of the working fluid supplied from second pump P2 except for a slight amount of the working fluid leaking from first check valve V1 is thus returned to second reservoir tank T2 without being returned to first reservoir tank T1. As a result, it is possible to maintain the steering assist by driving second pump P2. Further, since the working fluid is not reserved in first reservoir tank T1, even when first pump P1 is driven by engine E, the pilot pressure cannot be introduced into pressure chamber 46 of cylinder changeover valve 40 so that spool 44 is urged to move from the first axial position to the second axial position by the biasing force of valve spring 45. As a result, fluid communication between control valve 20 and respective pressure chambers Y1, Y2 of second power cylinder C2 is blocked to thereby provide no steering assist by second power cylinder C2.

Referring to FIG. 9, a case where abnormality occurs in the fluid pressure circuit for second pump P2 is explained. As shown in FIG. 9, when second supply passage F2 is broken at a portion as indicated by X, the working fluid leaks (flows out) from the portion X to thereby cause reduction of an amount of the working fluid in second reservoir tank T2 of reservoir tank T. The reduction of the amount (i.e., liquid level) of the working fluid is detected by liquid level sensor 51, and ECU 50 receives a detection signal from liquid level sensor 51. At this time, in a case where second pump P2 is in a driven state, ECU 50 stops the operation of electric motor M while maintaining a driven state of first pump P1. That is, since breakage is generated in the fluid pressure circuit for second pump P2, it is not necessary to maintain the driven state of second pump P2. Therefore, by stopping the operation of second pump P2, it is possible to serve for preventing useless power consumption.

After the actuation of second pump P2 is stopped, the working fluid is supplied to circulating fluid passage changeover valve 30 by only first pump P1 similarly to the case where only first pump P1 is driven under a condition that the power steering apparatus according to the embodiment is normally operated as shown in FIG. 5. In circulating fluid passage changeover valve 30, spool 34 is held in the first axial position by the pilot pressure supplied from first pump P1, so that the working fluid supplied by first pump P1 is introduced into control valve 20. As a result, an amount of the working fluid is supplied from control valve 20 to one of pressure chambers X1, X2 of first power cylinder C1 on the basis of the open state (i.e., the operating position) in accordance with the steering operation. On the other hand, on the basis of the supplied amount of the working fluid, the working fluid is discharged from the other of pressure chambers X1, X2 to circulating fluid passage changeover valve 30 through control valve 20. The working fluid discharged is circulated to first reservoir tank T1 through first tank connecting port TC1 communicated with discharge port XP in circulating fluid passage changeover valve 30, and first circulating fluid passage R1. A whole amount of the working fluid supplied from first pump P1 except for a slight amount of the working fluid leaking from second check valve V2 is thus returned to first reservoir tank T1 without being returned to second reservoir tank T2. As a result, it is possible to maintain the steering assist by driving first pump P1.

Further, since engine E is in the operating condition, and the fluid pressure circuit for first pump P1 is in a normal condition, the working fluid pressurized by first pump P1 is also introduced into pressure chamber 46 of cylinder changeover valve 40. In cylinder changeover valve 40, spool 44 is held in the first axial position by the pilot pressure supplied from first pump P1. As a result, on the basis of the open state (i.e., the operating position) of control valve 20, an amount of the working fluid is supplied from control valve 20 to one of pressure chambers Y1, Y2 of second power cylinder C2 according to the steering direction. On the other hand, on the basis of the supplied amount of the working fluid, the working fluid is discharged from the other of pressure chambers Y1, Y2 to control valve 20. The working fluid discharged is circulated to first reservoir tank T1 through circulating fluid passage changeover valve 30 similarly to the working fluid discharged from first power cylinder C1.

Referring to FIG. 10, a case where breakage occurs in second circulating fluid passage R2 for second pump P2 is explained. As shown in FIG. 10, when second circulating fluid passage R2 is broken at a portion as indicated by X, the working fluid leaks (flows out) from the portion X to thereby cause reduction of an amount of the working fluid in second reservoir tank T2. The reduction of the amount (i.e., liquid level) of the working fluid in second reservoir tank T2 is detected by liquid level sensor 51. ECU 50 receives a detection signal from liquid level sensor 51, and determines that the amount of the working fluid in second reservoir tank T2 is reduced. At this time, in a case where second pump P2 is in a driven state, ECU 50 stops the operation of electric motor M while maintaining a driven state of first pump P1. In circulating fluid passage changeover valve 30, spool 34 is held in the first axial position by the pilot pressure supplied from first pump P1, so that the working fluid supplied by first pump P1 is introduced into control valve 20. As a result, an amount of the working fluid is supplied from control valve 20 to one of pressure chambers X1, X2 of first power cylinder C1 on the basis of the open state (i.e., the operating position) in accordance with the steering operation. On the other hand, on the basis of the supplied amount of the working fluid, the working fluid is discharged from the other of pressure chambers X1, X2 to circulating fluid passage changeover valve 30 through control valve 20. The working fluid discharged is circulated to first reservoir tank T1 through first tank connecting port TC1 communicated with discharge port XP in circulating fluid passage changeover valve 30, and first circulating fluid passage R1. A whole amount of the working fluid supplied from first pump P1 except for a slight amount of the working fluid leaking from second check valve V2 is thus returned to first reservoir tank T1 without being returned to second reservoir tank T2. As a result, it is possible to maintain the steering assist by driving first pump P1.

Further, since engine E is in an operating condition, and the fluid pressure circuit for first pump P1 is in a normal condition, the working fluid supplied from first pump P1 to circulating fluid passage changeover valve 30 is also introduced into pressure chamber 46 of cylinder changeover valve 40. At this time, in cylinder changeover valve 40, spool 44 is held in the first axial position by the pilot pressure supplied from first pump P1 as explained above. As a result, on the basis of the open state (i.e., the operating position) of control valve 20, the working fluid is supplied from control valve 20 to one of pressure chambers Y1, Y2 of second power cylinder C2 according to the steering direction. On the other hand, the working fluid is discharged from the other of pressure chambers Y1, Y2 to control valve 20. A whole amount of the working fluid discharged is circulated to first reservoir tank T1 through circulating fluid passage changeover valve 30 similarly to the working fluid discharged from first power cylinder C1.

Next, a case where breakage occurs in any of connecting passages CN1, CN2 through which cylinder changeover valve 40 and second power cylinder C2 are connected with each other, is explained. FIG. 11 shows a case where breakage occurs at a portion of second connecting passage CN2 as indicated by X, and the working fluid leaks (flows out) from the portion X. In this case, engine E is in an operating condition, and the power steering apparatus according to the embodiment is in a normal operating condition. Accordingly, as shown in FIG. 11, the working fluid is supplied to circulating fluid passage changeover valve 30 by only first pump P1 or both first pump P1 and second pump P2, and spool 34 is held in the first axial position similarly to the case as shown in FIG. 5. In the first axial position, the working fluid is supplied to control valve 20 and one of pressure chambers Y1, Y2 of second power cylinder C2 according to the steering direction through cylinder changeover valve 40. At the same time, the working fluid is discharged from the other of pressure chambers Y1, Y2 toward control valve 20 through cylinder changeover valve 40. At this time, the working fluid discharged leaks from the portion X of second connecting passage CN2, so that the working fluid cannot be circulated to first reservoir tank T1 through control valve 20 and circulating fluid passage changeover valve 30 communicated with first reservoir tank T1.

As a result, the amount of the working fluid in first reservoir tank T1 is reduced. Similarly to the case where abnormality occurs in the fluid pressure circuit for first pump P1 as shown in FIG. 7 and FIG. 8, the reduction of the amount of the working fluid in first reservoir tank T1 is detected by liquid level sensor 51, and ECU 50 receives a detection signal from liquid level sensor 51 and determines that the amount of the working fluid in first reservoir tank T1 is reduced. At this time, in a case where second pump P2 is in a driven state, ECU 50 stops the operation of electric motor M while maintaining a driven state of first pump P1, thereby ensuring an amount of the working fluid in second reservoir tank T2. After that, at a time at which first reservoir tank T1 becomes empty due to leakage of the working fluid from the broken portion of second connecting passage CN2, supply of the working fluid by first pump P1 is not carried out so that spool 34 of circulating fluid passage changeover valve 30 is urged to move from the first axial position to the second axial position against the biasing force of valve spring 35. As a result, proximity switch 52 is turned to ON position by contact with the one axial end surface of spool 34. ECU 50 receives a detection signal from proximity switch 52, and determines that spool 34 is placed in the second axial position. ECU 50 then outputs a driving signal to electric motor M to thereby drive second pump P2.

The working fluid supplied by only second pump P2 is introduced into control valve 20 through circulating fluid passage changeover valve 30. The working fluid introduced into control valve 20 is then supplied to one of pressure chambers X1, X2 of first power cylinder C1. At the same time, the working fluid is discharged from the other of pressure chambers X1, X2 to circulating fluid passage changeover valve 30 through control valve 20. The working fluid discharged is circulated to second reservoir tank T2 through second tank connecting port TC2 communicated with discharge port XP in circulating fluid passage changeover valve 30, and second circulating fluid passage R2.

Further, as explained above, since the working fluid is not reserved in first reservoir tank T1, even when first pump P1 is driven by operating engine E, the pilot pressure cannot be introduced into pressure chamber 46 of cylinder changeover valve 40 so that spool 44 is urged to move from the first axial position to the second axial position by the biasing force of valve spring 45. As a result, fluid communication between respective supply-discharge passages PL1, PL2 and respective connecting passages CN1, CN2 through cylinder changeover valve 40 is blocked to thereby suppress the following leakage of the working fluid from the broken portion of second connecting passage CN2. Accordingly, steering assist by only first power cylinder C1 is carried out by driving second pump P2 while holding second power cylinder C2 in a non-actuated state.

As explained above, the power steering apparatus according to the embodiment includes circulating fluid passage changeover valve 30 arranged between control valve 20 and first and second pumps P1, P2. Circulating fluid passage changeover valve 30 can selectively establish fluid communication between control valve 20 and first circulating fluid passage R1 and fluid communication between control valve 20 and second circulating fluid passage R2 (i.e., carry out changeover between fluid communication of control valve 20 with first circulating fluid passage R1 and fluid communication of control valve 20 with second circulating fluid passage R2) while establishing fluid communication between control valve 20 and respective pumps P1, P2. With this arrangement and construction of circulating fluid passage changeover valve 30, even in a case where a malfunction occurs in one of the fluid pressure circuits for respective pumps P1, P2, the other of the fluid pressure circuits can be used. Further, simultaneous supply of the working fluid from both pumps P1, P2 can be carried out. As a result, it is not necessary to supply the working fluid by only one of first and second pumps P1, P2, thereby serving for downsizing respective pumps P1, P2 and reducing a drive loss that is caused upon supplying the working fluid only by the one of first and second pumps P1, P2.

Further, in the power steering apparatus according to the embodiment, fluid communication between control valve 20 and respective pumps P1, P2 is established regardless of the position of spool 34 within valve element accommodating bore 32 of circulating fluid passage changeover valve 30. This construction serves for simplifying circulating fluid passage changeover valve 30 and reducing the cost. Further, backflow of the working fluid supplied from respective pumps P1, P2 into valve element accommodating bore 32 through respective pump connecting ports PC1, PC2 can be suppressed by respective check valves V1, V2 disposed within respective pump connecting ports PC1, PC2. Accordingly, the fluid communication between control valve 20 and first pump P1 and the fluid communication between control valve 20 and second pump P2 can be simultaneously established without causing any problem.

Further, in the power steering apparatus according to the embodiment, engine E serves as a drive source of first pump P1, and electric motor M serves as a drive source of second pump P2. Therefore, changeover between first and second pumps P1, P2 as supply sources of the working fluid can be controlled on the basis of the operating condition of engine E and the stop condition thereof. For instance, even under an idling stop condition or an engine stall condition, steering assist can be provided by driving second pump P2 by electric motor M.

Further, in the power steering apparatus according to the embodiment, first and second pumps P1, P2 and first and second reservoir tanks T1, T2 for the fluid pressure circuits for pumps P1, P2 are arranged in a one-to-one correspondence. With this arrangement, basically, the working fluid in the fluid pressure circuit for first pump P1 is circulated to first reservoir tank T1, and the working fluid in the fluid pressure circuit for second pump P2 is circulated to second reservoir tank T2. Further, both reservoir tanks T1, T2 constitute integral reservoir tank T, and are separated by partition wall TW formed only on the lower side of reservoir tank T. With this construction, when the fluid pressure circuits for first and second pumps P1, P2 are in a normal condition, a fluid level of the working fluid within reservoir tank T is positioned at a height higher than a height of partition wall TW so that both reservoir tanks Ti, T2 can share the working fluid with each other. On the other hand, even when breakage occurs in one of the fluid pressure circuits for first and second pumps P1, P2 to thereby cause leakage of the working fluid, a necessary and sufficient amount of the working fluid for the other of the fluid pressure circuits for first and second pumps P1, P2 can be ensured.

Further, in the power steering apparatus according to the embodiment, changeover between first pump P1 and second pump P2 can be controlled on the basis of detection of an amount of the working fluid in reservoir tank T by liquid level sensor 51 and detection of an axial position of spool 34 of circulating fluid passage changeover valve 30 by proximity switch 52. With this construction, even in a case where leakage of the working fluid occurs in one of the fluid pressure circuits for first and second pumps P1, P2 due to breakage or the like, it is possible to suppress leakage of the working fluid due to the breakage or the like and successively provide steering assist by the other of the fluid pressure circuits for first and second pumps P1, P2 which is still in a normal condition. Specifically, in a case where the amount of the working fluid in reservoir tank T becomes smaller than a predetermined amount of the working fluid, electric motor M is stopped. As a result, even when there occurs breakage or the like in one of the fluid pressure circuits for first and second pumps P1, P2, it is possible to ensure an amount of the working fluid for use in the other of the fluid pressure circuits for first and second pumps P1, P2, thereby serving for maintaining the other of the fluid pressure circuits for first and second pumps P1, P2. In addition, after that, when proximity switch 52 is turned to the ON position, electric motor M is actuated. As a result, it is possible to determine the one of the fluid pressure circuits for first and second pumps P1, P2 in which breakage or the like occurs. Further, on the basis of the result of determination, it is possible to carry out such an appropriate operation that the one of the fluid pressure circuits for first and second pumps P1, P2 is allowed to be unavailable, and the other thereof is used to provide steering assist.

Furthermore, in the power steering apparatus according to the embodiment, when the working fluid can be supplied from first pump P1, second power cylinder C2 is useable to provide sufficient steering assist. On the other hand, when the working fluid cannot be supplied from first pump Pl, the fluid pressure is not supplied to second power cylinder C2, and is supplied to first power cylinder C1 by only second pump P2. Thus, it is possible to ensure an operation of first power cylinder C1.

The present invention is not limited to the above embodiment, and may be variously modified. For instance, a specific internal construction (or configuration) of circulating fluid passage changeover valve 30 such as annular grooves G1-G3 formed on the inner peripheral surface defining valve element accommodating bore 32, respective lands L1, L2, etc. can be modified in accordance with specification of the power steering apparatus, the cost, etc. as long as the fluid communication between control valve 20 and first pump P1 and the fluid communication between control valve 20 and second pump P2 can be established, and changeover between circulating fluid passages R1, R2 can be carried out.

This application is based on a prior Japanese Patent Application No. 2011-153512 filed on Jul. 12, 2011. The entire contents of the Japanese Patent Application No. 2011-153512 are hereby incorporated by reference.

Although the invention has been described above by reference to a certain embodiment of the invention, the invention is not limited to the embodiment described above. Further modifications and variations of the embodiment described above will occur to those skilled in the art in light of the above teachings. The scope of the invention is defined with reference to the following claims.

What is claimed is:

1. A power steering apparatus for a vehicle having a steering wheel and a steerable road wheel, the power steering apparatus comprising:

a steering mechanism configured to steer the steerable road wheel in accordance with a steering effort inputted to the steering mechanism through the steering wheel;

a power cylinder with a pair of pressure chambers which applies a steering force to the steerable road wheel based on a differential pressure between a pressure of a working fluid in a first one of the pair of pressure chambers and a pressure of the working fluid in a second one of the pair of pressure chambers;

a first pump that is rotationally driven to supply the working fluid to the power cylinder by a first drive source;

a second pump that is rotationally driven to supply the working fluid to the power cylinder by a second drive source provided separately from the first drive source;

a control valve disposed in the steering mechanism and configured to selectively supply the working fluid supplied from the first pump or the second pump to one of the pair of pressure chambers of the power cylinder in accordance with a steering operation of the steering wheel;

a first reservoir tank in which the working fluid is reserved;

a second reservoir tank in which the working fluid is reserved;

a return passage changeover valve disposed between the control valve and the first and second pumps, the return passage changeover valve comprising a valve element accommodating bore and a valve element disposed within the valve element accommodating bore so as to be moveable along an axial direction of the valve element accommodating bore, the return passage changeover valve being configured to communicate the first and second pumps with the control valve regardless of an axial position of the valve element and to communicate one of the first and second reservoir tanks with the control valve in accordance with the axial position of the valve element to thereby carry out changeover between a circulating fluid passage through which the working fluid is circulated to the first reservoir tank and a circulating fluid passage through which the working fluid is circulated to the second reservoir tank, a first check valve disposed between the first pump and the return passage changeover valve, the first check valve being operable to allow only a flow of the working fluid flowing from a side of the first pump toward a side of the return passage changeover valve, and a second check valve disposed between the second pump and the return passage changeover valve, the second check valve being operable to allow only a flow of the working fluid flowing from a side of the second pump toward the side of the return passage changeover valve, wherein when the working fluid is supplied from the first pump, the valve element of the return passage changeover valve is moved to a first axial position in which fluid communication between the control valve and the first reservoir tank is established and fluid communication between the control valve and the second reservoir tank is blocked, and wherein when the working fluid is supplied from the second pump only, the valve element of the return passage changeover valve is moved to a second axial position in which the fluid communication between the control valve and the first reservoir tank is blocked and the fluid communication between the control valve and the second reservoir tank is established.

2. The power steering apparatus as claimed in claim 1, wherein when the valve element of the return passage changeover valve is placed in the second axial position, fluid communication between the second pump and the control valve is established.

3. The power steering apparatus as claimed in claim 1,
wherein the valve element of the return passage changeover valve is a spool having a first land and a second land on an outer periphery thereof,
wherein the return passage changeover valve further comprises a valve body which is formed with the valve element accommodating bore, a first changeover groove and a second changeover groove which are formed on an inner peripheral surface of the valve body which defines the valve element accommodating bore,
wherein the first changeover groove is configured to cooperate with the first land to establish and block the fluid communication between the control valve and the first reservoir tank,
wherein the second changeover groove is configured to cooperate with the first land to establish and block the fluid communication between the control valve and the second reservoir tank,
wherein when the valve element of the return passage changeover valve is placed in the first axial position, the first land is overlapped with the second changeover groove in a radial direction of the valve element to thereby block the fluid communication between the control valve and the second reservoir tank, and
wherein when the valve element of the return passage changeover valve is placed in the second axial position, the second land is overlapped with the first changeover groove in the radial direction of the valve element to thereby block the fluid communication between the control valve and the first reservoir tank.

4. The power steering apparatus as claimed in claim 1,
wherein the return passage changeover valve further comprises a biasing member configured to always bias the valve element toward the second axial position, and
wherein the valve element has a pressure receiving surface to which a fluid pressure of the working fluid supplied from the first pump is applied so as to move the valve element toward the first axial position.

5. The power steering apparatus as claimed in claim 1, wherein the first drive source is an engine of the vehicle, and the second drive source is an electric motor.

6. The power steering apparatus as claimed in claim 1,
wherein the first reservoir tank has an upper side and a lower side,
wherein the second reservoir tank has an upper side and a lower side,
wherein the first and second reservoir tanks are configured such that the upper side of the first reservoir tank is communicable in a vertical direction with the upper side of the second reservoir tank, and
wherein the first and second reservoir tanks are configured such that the lower side of the first reservoir tank is separated from the lower side of the second reservoir tank in the vertical direction by a partition wall between the lower sides of the first and second reservoir tanks.

7. The power steering apparatus as claimed in claim 6, further comprising:
a fluid level sensor configured to detect whether or not a predetermined amount of the working fluid is reserved in the respective first and second reservoir tanks, and
a valve element position detecting sensor configured to detect whether or not the valve element is placed in the second axial position, wherein upon determination that an amount of the working fluid reserved in the respective first and second reservoir tanks is smaller than the predetermined amount based on the detection by the fluid level sensor, and upon determination that the valve element is placed in the first axial position based on the detection by the valve element position detecting sensor, the second drive source is stopped, and wherein upon determination that the amount of the working fluid reserved in the respective first and second reservoir tanks is smaller than the predetermined amount based on the detection by the fluid level sensor, and upon determination that the valve element is placed in the second axial position based on the detection by the valve element position detecting sensor, the second drive source is actuated.

8. The power steering apparatus as claimed in claim 1, further comprising:

a supplementary power cylinder having a pair of pressure chambers, and a supplementary power cylinder changeover valve disposed between the supplementary power cylinder and the control valve, wherein when the working fluid is supplied from the first pump, the supplementary power cylinder changeover valve is configured to establish fluid communication between the control valve and the supplementary power cylinder, and wherein when the working fluid is not supplied from the first pump, the supplementary power cylinder changeover valve is configured to block the fluid communication between the control valve and the supplementary power cylinder and to establish fluid communication between the pair of pressure chambers of the supplementary power cylinder.

* * * * *